US008811742B2

(12) United States Patent
Petrou et al.

(10) Patent No.: US 8,811,742 B2
(45) Date of Patent: Aug. 19, 2014

(54) IDENTIFYING MATCHING CANONICAL DOCUMENTS CONSISTENT WITH VISUAL QUERY STRUCTURAL INFORMATION

(75) Inventors: David Petrou, Brooklyn, NY (US); Ashok C. Popat, Menlo Park, CA (US); Matthew R. Casey, San Francisco, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/309,471

(22) Filed: Dec. 1, 2011

(65) Prior Publication Data

US 2012/0128251 A1 May 24, 2012

Related U.S. Application Data

(63) Continuation-in-part of application No. 12/852,189, filed on Aug. 6, 2010.

(60) Provisional application No. 61/418,842, filed on Dec. 1, 2010, provisional application No. 61/266,125, filed on Dec. 2, 2009.

(51) Int. Cl.
*G06K 9/62* (2006.01)

(52) U.S. Cl.
USPC .......................................................... 382/187

(58) Field of Classification Search
None
See application file for complete search history.

(56) References Cited

U.S. PATENT DOCUMENTS

| 5,615,384 A | 3/1997 | Allard et al. |
| 5,724,571 A | 3/1998 | Woods |
| 5,764,799 A | 6/1998 | Hong et al. |
| 6,137,907 A | 10/2000 | Clark et al. |
| 6,182,063 B1 | 1/2001 | Woods |
| 6,363,179 B1 | 3/2002 | Evans et al. |
| 6,408,293 B1 | 6/2002 | Aggarwal et al. |
| 6,594,658 B2 | 7/2003 | Woods |
| 7,113,944 B2 | 9/2006 | Zhang et al. |

(Continued)

FOREIGN PATENT DOCUMENTS

| CN | 101375281 | 2/2009 |
| DE | 10245900 A1 | 4/2004 |

(Continued)

OTHER PUBLICATIONS

Petrou, Office Action, U.S. Appl. No. 12/853,188, May 8, 2013, 21 pgs.

(Continued)

*Primary Examiner* — Brian P Werner
(74) *Attorney, Agent, or Firm* — Fish & Richardson P.C.

(57) ABSTRACT

A server system receives a visual query from a client system, performs optical character recognition (OCR) on the visual query to produce text recognition data representing textual characters, including a plurality of textual characters in a contiguous region of the visual query. The server system also produces structural information associated with the textual characters in the visual query. Textual characters in the plurality of textual characters are scored. The method further includes identifying, in accordance with the scoring, one or more high quality textual strings, each comprising a plurality of high quality textual characters from among the plurality of textual characters in the contiguous region of the visual query. A canonical document that includes the one or more high quality textual strings and that is consistent with the structural information is retrieved. At least a portion of the canonical document is sent to the client system.

24 Claims, 28 Drawing Sheets

(56) References Cited

U.S. PATENT DOCUMENTS

| | | | |
|---|---|---|---|
| 7,421,155 | B2 | 9/2008 | King et al. |
| 7,668,405 | B2 | 2/2010 | Gallagher |
| 7,917,514 | B2 | 3/2011 | Lawler et al. |
| 7,934,156 | B2 | 4/2011 | Forstall et al. |
| 8,452,794 | B2 | 5/2013 | Yang et al. |
| 8,489,589 | B2 | 7/2013 | Mei et al. |
| 2003/0065779 | A1 | 4/2003 | Malik et al. |
| 2005/0083413 | A1 | 4/2005 | Reed et al. |
| 2005/0086224 | A1* | 4/2005 | Franciosa et al. ............ 707/6 |
| 2005/0097131 | A1 | 5/2005 | Benco et al. |
| 2005/0123200 | A1* | 6/2005 | Myers et al. ............ 382/182 |
| 2005/0162523 | A1 | 7/2005 | Darrell et al. |
| 2006/0020630 | A1 | 1/2006 | Stager et al. |
| 2006/0041543 | A1 | 2/2006 | Achlioptas |
| 2006/0048059 | A1 | 3/2006 | Etkin |
| 2006/0085477 | A1 | 4/2006 | Phillips et al. |
| 2006/0150119 | A1 | 7/2006 | Chesnais et al. |
| 2006/0193502 | A1 | 8/2006 | Yamaguchi |
| 2006/0227992 | A1 | 10/2006 | Rathus et al. |
| 2006/0253491 | A1 | 11/2006 | Gokturk et al. |
| 2007/0011149 | A1 | 1/2007 | Walker |
| 2007/0086669 | A1 | 4/2007 | Berger et al. |
| 2007/0098303 | A1 | 5/2007 | Gallagher et al. |
| 2007/0106721 | A1 | 5/2007 | Schloter |
| 2007/0143312 | A1 | 6/2007 | Wiseman |
| 2007/0201749 | A1 | 8/2007 | Yamauchi et al. |
| 2007/0245245 | A1 | 10/2007 | Blue et al. |
| 2007/0268392 | A1 | 11/2007 | Paalasmaa et al. |
| 2008/0031506 | A1 | 2/2008 | Agatheeswaran et al. |
| 2008/0080745 | A1 | 4/2008 | Vanhoucke et al. |
| 2008/0226119 | A1 | 9/2008 | Candelore et al. |
| 2008/0267504 | A1 | 10/2008 | Schloter et al. |
| 2008/0317339 | A1 | 12/2008 | Steinberg et al. |
| 2009/0031244 | A1 | 1/2009 | Brezina et al. |
| 2009/0060289 | A1 | 3/2009 | Shah et al. |
| 2009/0097748 | A1 | 4/2009 | Lee et al. |
| 2009/0100048 | A1 | 4/2009 | Hull et al. |
| 2009/0129571 | A1 | 5/2009 | Altberg et al. |
| 2009/0144056 | A1 | 6/2009 | Aizenbud-Reshef et al. |
| 2009/0237546 | A1 | 9/2009 | Bloebaum et al. |
| 2009/0254539 | A1 | 10/2009 | Wen et al. |
| 2010/0046842 | A1 | 2/2010 | Conwell |
| 2010/0169770 | A1 | 7/2010 | Hong et al. |
| 2011/0035406 | A1 | 2/2011 | Petrou et al. |
| 2011/0085057 | A1 | 4/2011 | Takahashi |
| 2011/0131235 | A1 | 6/2011 | Petrou et al. |
| 2011/0135207 | A1 | 6/2011 | Flynn et al. |
| 2012/0093371 | A1 | 4/2012 | Li et al. |
| 2012/0134590 | A1 | 5/2012 | Petrou et al. |

FOREIGN PATENT DOCUMENTS

| | | |
|---|---|---|
| EP | 0942389 A2 | 9/1999 |
| EP | 1796019 A1 | 6/2007 |
| KR | 20090073294 A | 7/2009 |
| WO | WO 00/49526 A1 | 8/2000 |
| WO | WO 02/17166 A2 | 2/2002 |
| WO | WO 02/42864 A3 | 5/2002 |
| WO | WO 2005/114476 A1 | 12/2005 |
| WO | WO 2006/070047 A1 | 7/2006 |
| WO | WO 2006/137667 A1 | 12/2006 |
| WO | WO 2008/097051 A1 | 8/2008 |

OTHER PUBLICATIONS

Google Inc., International Search Report and Written Opinion, PCT/US2011/062930, May 2, 2012, 10 pgs.

Google Inc., Office Action, Australian Patent Application No. 2010279333, Jul. 19, 2012, 3 pgs.

Google Inc., Office Action, Australian Patent Application No. 2010279334, Jul. 24, 2012, 3 pgs.

Google Inc., Office Action, Australian Patent Application No. 2010326654, Aug. 22, 2012, 3 pgs.

Petrou, Office Action, U.S. Appl. No. 12/850,483, Mar. 9, 2012, 9 Pgs.

Petrou, Office Action, U.S. Appl. No. 12/850,513, Mar. 28, 2012, 13 pgs.

Petrou, Office Action, U.S. Appl. No. 12/851,473, Sep. 11, 2012, 33 pgs.

Petrou, Office Action, U.S. Appl. No. 12/852,189, Sep. 13, 2012, 9 pgs.

Petrou, Office Action, U.S. Appl. No. 12/853,878, Feb. 1, 2014, 26 pgs.

Petrou, Office Action, U.S. Appl. No. 12/853,878, Jun. 13, 2012, 41 pgs.

Petrou, Office Action, U.S. Appl. No. 12/854,793, Feb. 17, 2012, 31 pgs.

Petrou, Office Action, U.S. Appl. No. 12/854,793, Jun. 13, 2012, 33 pgs.

Petrou, Office Action, U.S. Appl. No. 12/855,563, Oct. 5, 2012, 22 pgs.

Google Inc., Notice of Acceptance, AU 2010279333, Feb. 8, 2013, 3 pgs.

Google Inc., Office Action, AU 2010279248, Oct. 4, 2012, 3 pgs.
Google Inc., Office Action, AU 2010279248, Feb. 5, 2013, 3 pgs.
Google Inc., Office Action, AU 2010279334, Jan. 31, 2013, 3 pgs.
Google Inc., Office Action, AU 2010326655, Nov. 23, 2012, 3 pgs.
Google Inc., Office Action, CN 201080045164.6, Feb. 8, 2013, 15 pgs.

Google Inc., Office Action, EP 10742974.8, Dec. 3, 2012, 7 pgs.
Petrou, Office Action, U.S. Appl. No. 12/850,483, Mar. 26, 2013, 11 pgs.

Petrou, Office Action, U.S. Appl. No. 12/850,513, Jan. 25, 2013, 22 pgs.

Petrou, Office Action, U.S. Appl. No. 12/851,473, Mar. 29, 2013, 34 pgs.

Petrou, Office Action, U.S. Appl. No. 12/852,189, Apr. 1, 2013, 11 pgs.

Anagnostopoulos, Information fusion meta-search interface for precise photo acquisition on the web, ITI 2003, Jun. 16-19, 2003, Cavtat, Croatia, pp. 375-381.

Anonymous, GPS Enabled Dating??, http://andrightlyso.com/2006/11/30/gps-enabled-dating, Nov. 30, 2006, 21 pgs.

Anonymous, How do I create an image with StudiVZ-linking?, limil-limil Beta, Aug. 20, 2008, 5 pgs.

Castro, iPhoto's new Faces feature really does work!, Feb. 17, 2009, 8 pgs.

Frucci, Half-Amazing, Half-Terrifying Concept App Combines Facial Recognition with Augmented Reality, Jul. 22, 2009, 2 pgs.

Google Inc., International Search Report and Written Opinion, PCT/US2010/044603, Nov. 17, 2010, 11 pgs.

Google Inc., International Search Report and Written Opinion, PCT/US2010/044604, Oct. 6, 2010, 10 pgs.

Google Inc., International Search Report and Written Opinion, PCT/US2010/044771, Dec. 16, 2010, 13 pgs.

Google Inc., International Search Report and Written Opinion, PCT/US2010/044885, Oct. 20, 2010, 7 pgs.

Google Inc., International Search Report and Written Opinion, PCT/US2010/045009, Nov. 17, 2010, 7 pgs.

Google Inc., International Search Report and Written Opinion, PCT/US2010/045316, Dec. 7, 2010, 6 pgs.

Google Inc., International Search Report and Written Opinion, PCT/US2010/045631, Sep. 5, 2011, 12 pages.

Stone, Autotagging Facebook: Social Network Context Improves Photo Annotation, IEEE Computer Society Conference on Computer Vision and Pattern Recognition Workshops, Piscataway, NJ, Jun. 2008, 8 pgs.

Bengio, Office Action, U.S. Appl. No. 13/570,162, Oct. 15, 2013, 20 pgs.

Google Inc., Patent Examination Report No. 2, AU 2010326654, Sep. 6, 2013, 3 pgs.

Google Inc., Patent Examination Report No. 2, AU 2010326655, May 29, 2013, 3 pgs.

Google Inc., Patent Examination Report No. 3, AU 2010279334, Jun. 27, 2013, 3 pgs.

Petrou, Final Office Action, U.S. Appl. No. 12/855,563, Jul. 5, 2013, 24 pgs.

Petrou, Notice of Allowance, U.S. Appl. No. 12/851,473, Oct. 8, 2013, 11 pgs.

* cited by examiner

IDENTIFYING MATCHING CANONICAL DOCUMENTS CONSISTENT WITH VISUAL QUERY STRUCTURAL INFORMATION

RELATED APPLICATIONS

This application claims priority to U.S. Provisional Patent Application No. 61/418,842, filed Dec. 1, 2010, entitled "Identifying Matching Canonical Documents in Response to a Visual Query" and is a continuation-in-part of U.S. patent application Ser. No. 12/852,189, filed Aug. 6, 2010, entitled "Identifying Matching Canonical Documents in Response to a Visual Query," which claims the benefit of U.S. Provisional Patent Application No. 61/266,125, filed Dec. 2, 2009 entitled "Identifying Matching Canonical Documents in Response to a Visual Query," which are incorporated by reference herein in their entirety.

This application is related to the following U.S. Patent Applications and U.S. Provisional Patent Applications all of which are incorporated by reference herein in their entirety:

U.S. Provisional Patent Application No. 61/266,116, filed Dec. 2, 2009, entitled "Architecture for Responding to a Visual Query," and U.S. patent application Ser. No. 12/850,483, filed Aug. 4, 2010;

U.S. Provisional Patent Application No. 61/266,122, filed Dec. 2, 2009, entitled "User Interface for Presenting Search Results for Multiple Regions of a Visual Query," and U.S. patent application Ser. No. 12/850,513, filed Aug. 4, 2010;

U.S. Provisional Patent Application No. 61/266,126, filed Dec. 2, 2009, entitled "Region of Interest Selector for Visual Queries," and U.S. patent application Ser. No. 12/853,188, filed Aug. 9, 2010;

U.S. Provisional Patent Application No. 61/266,130, filed Dec. 2, 2009, entitled "Actionable Search Results for Visual Queries," and U.S. patent application Ser. No. 12/854,793, flied Aug. 11, 2010;

U.S. Provisional Patent Application No. 61/266,133, filed Dec. 2, 2009, entitled "Actionable Search Results for Street View Visual Queries," and U.S. patent application Ser. No. 12/853,878, filed Aug. 10, 2010;

U.S. Provisional Patent Application No. 61/266,499, filed Dec. 3, 2009, entitled "Hybrid Use Location Sensor Data and Visual Query to Return Local Listing for Visual Query," and U.S. patent application Ser. No. 12/855,563, filed Aug. 12, 2010; and U.S. Provisional Patent Application No. 61/370,784, filed Aug. 4, 2010, entitled "Facial Recognition with Social Network Aiding," and U.S. patent application Ser. No. 12/851,473, filed Aug. 5, 2010.

TECHNICAL FIELD

The disclosed embodiments relate generally to the field of optical character recognition (OCR), and in particular to displaying a canonical source document containing strings of high quality text extracted from a visual query.

BACKGROUND

Text-based or term-based searching, wherein a user inputs a word or phrase into a search engine and receives a variety of results is a useful tool for searching. Term based queries require a user to explicitly provide search terms in the form of words, phrases and/or other terms. Sometimes a user may wish to locate a particular desired document, rather than just information about relevant to one or more query terms. In such instances, locating that desired document using a term based query may require typing a long query string, such as an entire sentence without mistakes, or composing a combination of terms that the user thinks occur in the desired document but in relatively few other documents. Accordingly, a system that can receive a visual query such as a picture of the document, or a portion of the document, and use it to locate a canonical source document would be desirable.

SUMMARY OF DISCLOSED EMBODIMENTS

In some embodiments disclosed herein, a computer-implemented method of processing a visual query, performed by a server system having one or more processors and memory storing one or more programs for execution by the one or more processors, includes receiving a visual query from a client system distinct from the server system, performing optical character recognition (OCR) on the visual query to produce text recognition data representing textual characters, including a plurality of textual characters in a contiguous region of the visual query, and structural information associated with the plurality of textual characters in the contiguous region of the visual query, and scoring each textual character in the plurality of textual characters. The method further includes identifying, in accordance with the scoring, one or more high quality textual strings, each comprising a plurality of high quality textual characters from among the plurality of textual characters in the contiguous region of the visual query; retrieving a canonical document that includes the one or more high quality textual strings and that is consistent with the structural information; and sending at least a portion of the canonical document to the client system.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the embodiments. However, it will be apparent to one of ordinary skill in the art that various embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1:
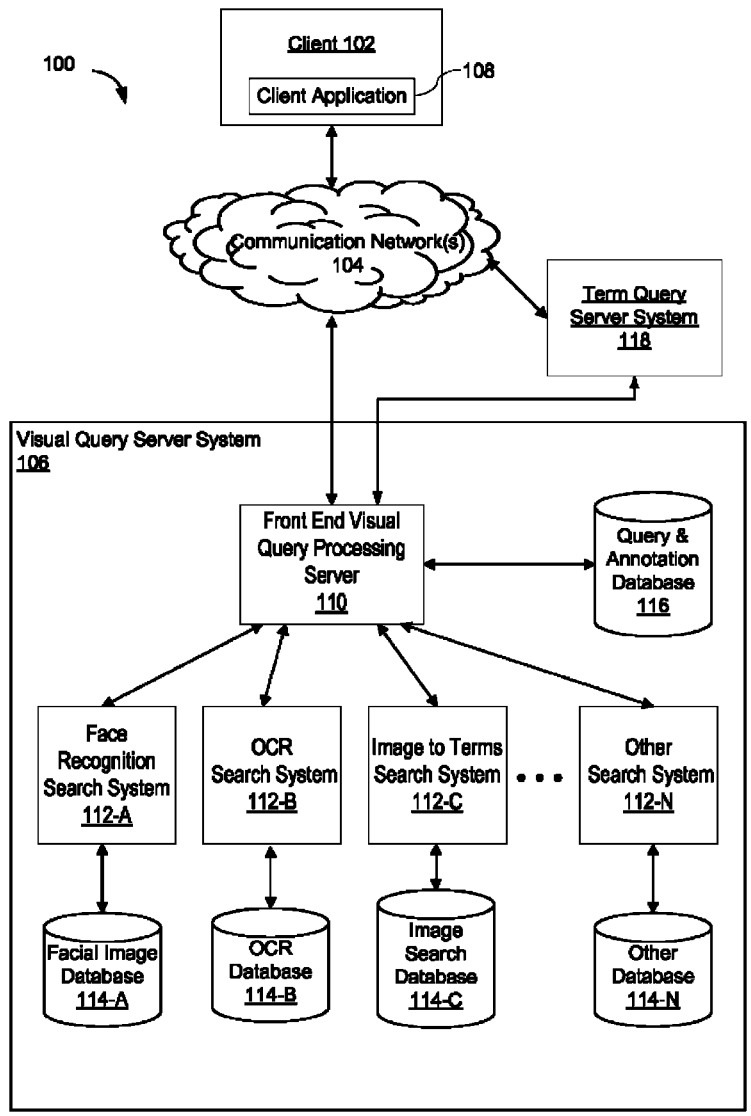
FIG. 1 is a block diagram illustrating a computer network that includes a visual query server system.

FIG. 1 is a block diagram illustrating a computer network that includes a visual query server system according to some embodiments. The computer network 100 includes one or more client systems 102 and a visual query server system 106. One or more communications networks 104 interconnect these components. The communications network 104 is any of a variety of networks, including local area networks (LAN), wide area networks (WAN), wireless networks, wireline networks, the Internet, or a combination of such networks.

Figure 11:
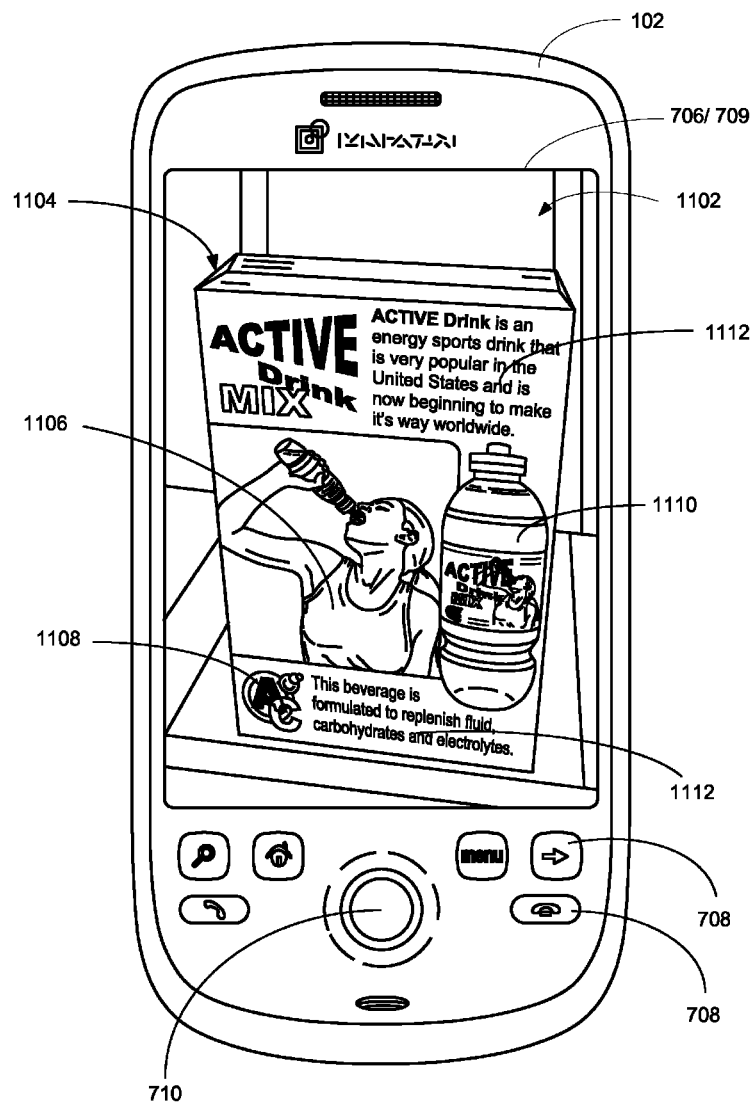
FIG. 11 illustrates a client system with a screen shot of an exemplary visual query, in accordance with some embodiments.

The client system 102 includes a client application 108, which is executed by the client system, for receiving a visual query (e.g., visual query 1102 of FIG. 11). A visual query is an image that is submitted as a query to a search engine or search system. Examples of visual queries, without limitations include photographs, scanned documents and images, and drawings. In some embodiments, the client application 108 is selected from the set consisting of a search application, a search engine plug-in for a browser application, and a search engine extension for a browser application. In some embodiments, the client application 108 is an "omnivorous" search box, which allows a user to drag and drop any format of image into the search box to be used as the visual query.

A client system 102 sends queries to and receives data from the visual query server system 106. The client system 102 may be any computer or other device that is capable of communicating with the visual query server system 106. Examples include, without limitation, desktop and notebook computers, mainframe computers, server computers, mobile devices such as mobile phones and personal digital assistants, network terminals, and set-top boxes.

The visual query server system 106 includes a front end visual query processing server 110. The front end server 110 receives a visual query from the client 102, and sends the visual query to a plurality of parallel search systems 112 for simultaneous processing. The search systems 112 each implement a distinct visual query search process and access their corresponding databases 114 as necessary to process the visual query by their distinct search process. For example, a face recognition search system 112-A will access a facial image database 114-A to look for facial matches to the image query. As will be explained in more detail with regard to FIG. 9, if the visual query contains a face, the facial recognition search system 112-A will return one or more search results (e.g., names, matching faces, etc.) from the facial image database 114-A. In another example, the optical character recognition (OCR) search system 112-B, converts any recognizable text in the visual query into text for return as one or more search results. In some implementations, the optical character recognition (OCR) search system 112-B accesses an OCR database 114-B to recognize particular fonts or text patterns as explained in more detail with regard to FIG. 8.

Any number of parallel search systems 112 may be used. Some examples include a facial recognition search system 112-A, an OCR search system 112-B, an image-to-terms search system 112-C (which may recognize an object or an object category), a product recognition search system (which is configured to recognize 2-D images such as book covers and CDs and is optionally also configured to recognize 3-D images such as furniture), bar code recognition search system (which recognizes 1D and 2D style bar codes), a named entity recognition search system, landmark recognition (which is configured to recognize particular famous landmarks like the Eiffel Tower and is optionally configured to recognize a corpus of specific images such as billboards), place recognition aided by geo-location information provided by a GPS receiver in the client system 102 or mobile phone network, a color recognition search system, and a similar image search system (which searches for and identifies images similar to a visual query). In some embodiments, the parallel search systems 112 include one or more additional search systems 112-N, such as a search engine system that returns search results in response to a text search query (e.g., results that identify web documents, products, etc.). All of the search systems, except the OCR search system 112-B, are collectively defined herein as search systems performing an image-match process. All of the search systems including the OCR search system are collectively referred to as query-by-image search systems. In some embodiments, the visual query server system 106 includes a facial recognition search system 112-A, an OCR search system 112-B, and at least one other query-by-image search system 112.

The parallel search systems 112 each individually process the visual search query and return their results to the front end server system 110. In some embodiments, the front end server 100 performs one or more analyses on the search results such as one or more of: aggregating the results into a compound document, choosing a subset of results to display, and ranking the results as will be explained in more detail with regard to FIG. 6. The front end server 110 communicates the search results to the client system 102.

The client system 102 presents the one or more search results to the user. The results are typically presented on a display, by an audio speaker, or any other means used to communicate information to a user. The user may interact with the search results in a variety of ways. In some embodiments, the user's selections, annotations, and other interactions with the search results are transmitted to the visual query server system 106 and recorded along with the visual query in a query and annotation database 116. Information in the query and annotation database can be used to improve visual query results. In some embodiments, the information from the query and annotation database 116 is periodically pushed to the parallel search systems 112, which incorporate any relevant portions of the information into their respective individual databases 114.

The computer network 100 optionally includes a term query server system 118, for performing searches in response to term queries. A term query is a query containing one or more terms, as opposed to a visual query which contains an image. The term query server system 118 is used to generate search results that supplement information produced by the various search engines in the visual query server system 106. The results returned from the term query server system 118 may include results in any format, such as textual documents, images, video, etc. While term query server system 118 is shown as a separate system in FIG. 1, optionally the visual query server system 106 may include a term query server system 118.

Additional information about the operation of the visual query server system 106 is provided below with respect to the flowcharts in FIGS. 2-4.

Figure 2:
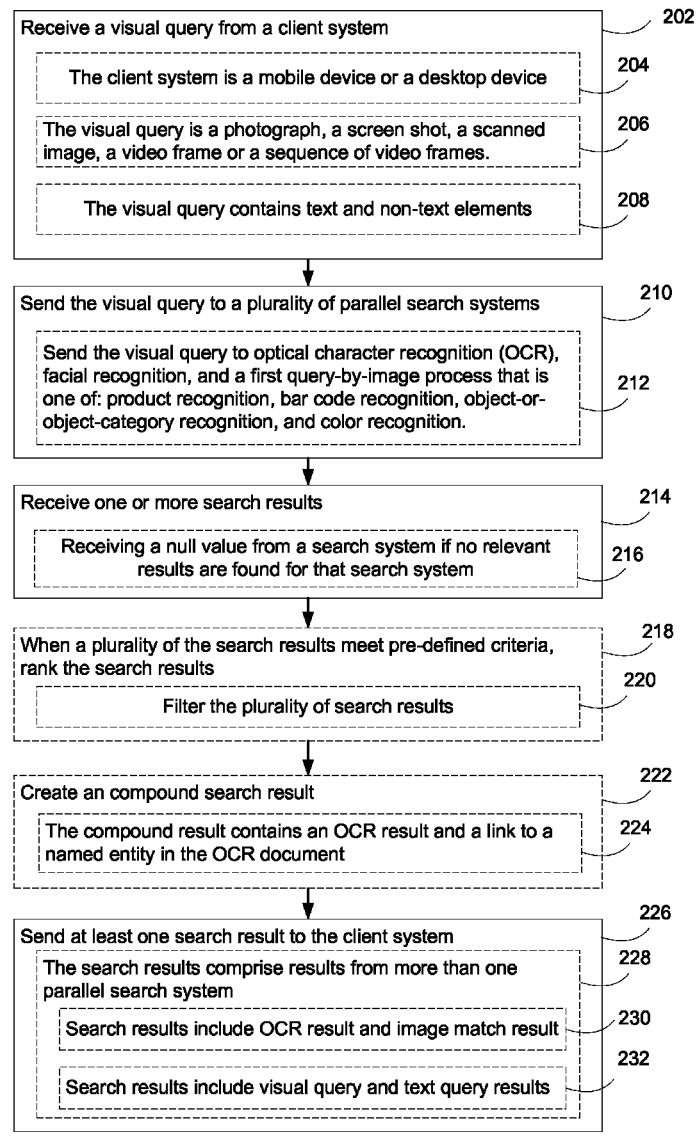
FIG. 2 is a flow diagram illustrating the process for responding to a visual query, in accordance with some embodiments.

FIG. 2 is a flow diagram illustrating a visual query server system method for responding to a visual query, according to some embodiments. Each of the operations shown in FIG. 2 correspond to instructions stored in a computer memory or non-transitory computer readable storage medium that stores one or more programs for execution by one or more processors of the visual query server system.

The visual query server system receives a visual query from a client system (202). The client system, for example, may be a desktop computing device, a mobile device, or another similar device (204) as explained with reference to FIG. 1. An example visual query on an example client system is shown in FIG. 11.

The visual query is an image document of any suitable format. For example, the visual query can be a photograph, a screen shot, a scanned image, or a frame or a sequence of multiple frames of a video (206). In some embodiments, the visual query is a drawing produced by a content authoring program (736, FIG. 5). As such, in some embodiments, the user "draws" the visual query, while in other embodiments the user scans or photographs the visual query. Some visual queries are created using an image generation application such as Acrobat, a photograph editing program, a drawing program, or an image editing program. For example, a visual query could come from a user taking a photograph of his friend on his mobile phone and then submitting the photograph as the visual query to the server system. The visual query could also come from a user scanning a page of a magazine, or taking a screen shot of a webpage on a desktop computer and then submitting the scan or screen shot as the visual query to the server system. In some embodiments, the visual query is submitted to the server system 106 through a search engine extension of a browser application, through a plug-in for a browser application, or by a search application executed by the client system 102. In some implementations, visual queries are also submitted by other application programs (executed by a client system) that support or generate images which can be transmitted to a remotely located server by the client system.

The visual query can be a combination of text and non-text elements (208). For example, a query could be a scan of a magazine page containing images and text, such as a person standing next to a road sign. A visual query can include an image of a person's face, whether taken by a camera embedded in the client system or a document scanned by or otherwise received by the client system. A visual query can also be a scan of a document containing only text. The visual query can also be an image of numerous distinct subjects, such as several birds in a forest, a person and an object (e.g., car, park bench, etc.), a person and an animal (e.g., pet, farm animal, butterfly, etc.). In some circumstances, visual queries have two or more distinct elements. For example, a visual query could include a barcode and an image of a product or product name on a product package. For example, the visual query could be a picture of a book cover that includes the title of the book, cover art, and a bar code. In some instances, one visual query will produce two or more distinct search results corresponding to different portions of the visual query, as discussed in more detail below.

The server system processes the visual query as follows. The front end server system sends the visual query to a plurality of parallel search systems for simultaneous processing (210). Each search system implements a distinct visual query search process, i.e., an individual search system processes the visual query by its own processing scheme.

In some embodiments, one of the search systems to which the visual query is sent for processing is an optical character recognition (OCR) search system. In some embodiments, one of the search systems to which the visual query is sent for processing is a facial recognition search system. In some embodiments, the plurality of search systems running distinct visual query search processes includes at least: optical character recognition (OCR), facial recognition, and another query-by-image process other than OCR and facial recognition (212). The other query-by-image process is selected from a set of processes that includes but is not limited to product recognition, bar code recognition, object-or-object-category recognition, named entity recognition, and color recognition (212).

In some embodiments, named entity recognition occurs as a post process of the OCR search system, wherein the text result of the OCR is analyzed for famous people, locations, objects and the like, and then the terms identified as being named entities are searched in the term query server system (118, FIG. 1). In other embodiments, images of famous landmarks, logos, people, album covers, trademarks, etc. are recognized by an image-to-terms search system. In other embodiments, a distinct named entity query-by-image process separate from the image-to-terms search system is utilized. The object-or-object category recognition system recognizes generic result types like "car." In some embodiments, this system also recognizes product brands, particular product models, and the like, and provides more specific descriptions, like "Porsche." Some of the search systems could be special user specific search systems. For example, particular versions of color recognition and facial recognition could be a special search systems used by the blind.

The front end server system receives results from the parallel search systems (214). In some embodiments, the results are accompanied by a search score. For some visual queries, some of the search systems will find no relevant results. For example, if the visual query was a picture of a flower, the facial recognition search system and the bar code search system will not find any relevant results. In some embodiments, if no relevant results are found, a null or zero search score is received from that search system (216). In some embodiments, if the front end server does not receive a result from a search system after a pre-defined period of time (e.g., 0.2, 0.5, 1, 2 or 5 seconds), it will process the received results as if that timed out server produced a null search score and will process the received results from the other search systems.

Optionally, when at least two of the received search results meet pre-defined criteria, they are ranked (218). In some embodiments, one of the predefined criteria excludes void results. A pre-defined criterion is that the results are not void. In some embodiments, one of the predefined criteria excludes results having numerical score (e.g., for a relevance factor) that falls below a pre-defined minimum score. Optionally, the plurality of search results are filtered (220). In some embodiments, the results are only filtered if the total number of results exceeds a pre-defined threshold. In some embodiments, all the results are ranked but the results falling below a pre-defined minimum score are excluded. For some visual queries, the content of the results are filtered. For example, if some of the results contain private information or personal protected information, these results are filtered out.

Optionally, the visual query server system creates a compound search result (222). One embodiment of this is when more than one search system result is embedded in an interactive results document as explained with respect to FIG. 3. The term query server system (118, FIG. 1) augments the results from one of the parallel search systems with results from a term search, where the additional results are either links to documents or information sources, or text and/or images containing additional information that may be relevant to the visual query. Thus, for example, the compound search result may contain an OCR result and a link to a named entity in the OCR document (224).

In some embodiments, the OCR search system (112-B, FIG. 1) or the front end visual query processing server (110, FIG. 1) recognizes likely relevant words in the text. For example, it may recognize named entities such as famous people or places. The named entities are submitted as query terms to the term query server system (118, FIG. 1). In some embodiments, the term query results produced by the term query server system are embedded in the visual query result as a "link." In some embodiments, the term query results are returned as separate links. For example, if a picture of a book cover were the visual query, it is likely that an object recognition search system will produce a high scoring hit for the book. As such a term query for the title of the book will be run on the term query server system 118 and the term query results are returned along with the visual query results. In some embodiments, the term query results are presented in a labeled group to distinguish them from the visual query results. The results may be searched individually, or a search may be performed using all the recognized named entities in the search query to produce particularly relevant additional search results. For example, if the visual query is a scanned travel brochure about Paris, the returned result may include links to the term query server system 118 for initiating a search on a term query "Notre Dame." Similarly, compound search results include results from text searches for recognized famous images. For example, in the same travel brochure, live links to the term query results for famous destinations shown as pictures in the brochure like "Eiffel Tower" and "Louvre" may also be shown (even if the terms "Eiffel Tower" and "Louvre" did not appear in the brochure itself.)

The visual query server system then sends at least one result to the client system (226). Typically, if the visual query processing server receives a plurality of search results from at least some of the plurality of search systems, it will then send at least one of the plurality of search results to the client system. For some visual queries, only one search system will return relevant results. For example, in a visual query containing only an image of text, only the OCR server's results are likely to be relevant. For some visual queries, only one result from one search system is relevant. For example, only the product related to a scanned bar code may be relevant. In these instances, the front end visual processing server will return only the relevant search result(s). For some visual queries, a plurality of search results are sent to the client system, and the plurality of search results include search results from more than one of the parallel search systems (228). This may occur when more than one distinct image is in the visual query. For example, if the visual query were a picture of a person riding a horse, results for facial recognition of the person could be displayed along with object identification results for the horse. In some embodiments, all the results for a particular query by image search system are grouped and presented together. For example, the top N facial recognition results are displayed under a heading "facial recognition results" and the top N object recognition results are displayed together under a heading "object recognition results." Alternatively, as discussed below, the search results from a particular image search system are grouped by image region. For example, if the visual query includes two faces, both of which produce facial recognition results, the results for each face would be presented as a distinct group. For some visual queries (e.g., a visual query including an image of both text and one or more objects), the search results include both OCR results and one or more image-match results (230).

In some circumstances, the user may wish to learn more about a particular search result. For example, if the visual query was a picture of a dolphin and the "image to terms" search system returns the following terms "water," "dolphin," "blue," and "Flipper;" the user may wish to run a text based query term search on "Flipper." When the user wishes to run a search on a term query (e.g., as indicated by the user clicking on or otherwise selecting a corresponding link in the search results), the query term server system (118, FIG. 1) is accessed, and the search on the selected term(s) is run. The corresponding search term results are displayed on the client system either separately or in conjunction with the visual query results (232). In some embodiments, the front end visual query processing server (110, FIG. 1) automatically (i.e., without receiving any user command, other than the initial visual query) chooses one or more top potential text results for the visual query, runs those text results on the term query server system 118, and then returns those term query results along with the visual query result to the client system as a part of sending at least one search result to the client system (232). In the example above, if "Flipper" was the first term result for the visual query picture of a dolphin, the front end server runs a term query on "Flipper" and returns those term query results along with the visual query results to the client system. This embodiment, wherein a term result that is considered likely to be selected by the user is automatically executed prior to sending search results from the visual query to the user, saves the user time. In some embodiments, these results are displayed as a compound search result (222) as explained above. In other embodiments, the results are part of a search result list instead of or in addition to a compound search result.

Figure 3:
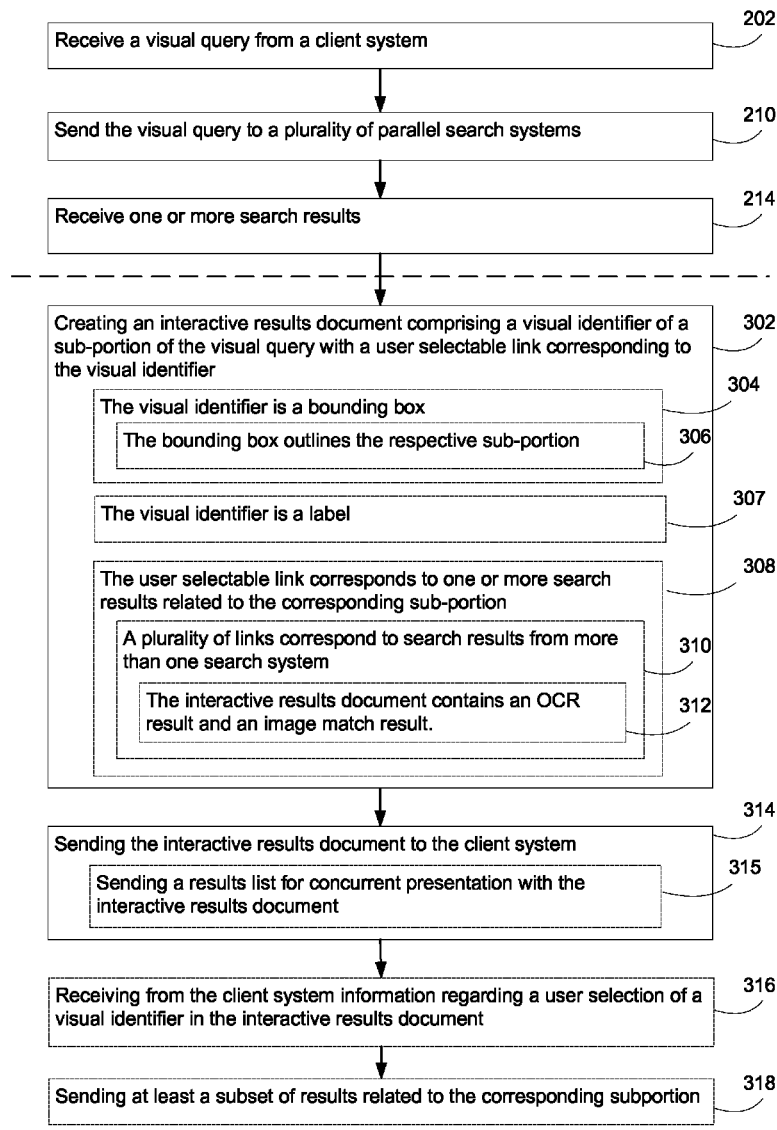
FIG. 3 is a flow diagram illustrating the process for responding to a visual query with an interactive results document, in accordance with some embodiments.

FIG. 3 is a flow diagram illustrating the process for responding to a visual query with an interactive results document. The first three operations (202, 210, 214) are described above with reference to FIG. 2. From the search results which are received from the parallel search systems (214), an interactive results document is created (302).

Creating the interactive results document (302) will now be described in detail. For some visual queries, the interactive results document includes one or more visual identifiers of respective sub-portions of the visual query. Each visual identifier has at least one user selectable link to at least one of the search results. A visual identifier identifies a respective sub-portion of the visual query. For some visual queries, the interactive results document has only one visual identifier with one user selectable link to one or more results. In some embodiments, a respective user selectable link to one or more of the search results has an activation region, and the activation region corresponds to the sub-portion of the visual query that is associated with a corresponding visual identifier.

Figures 12A, 12B:
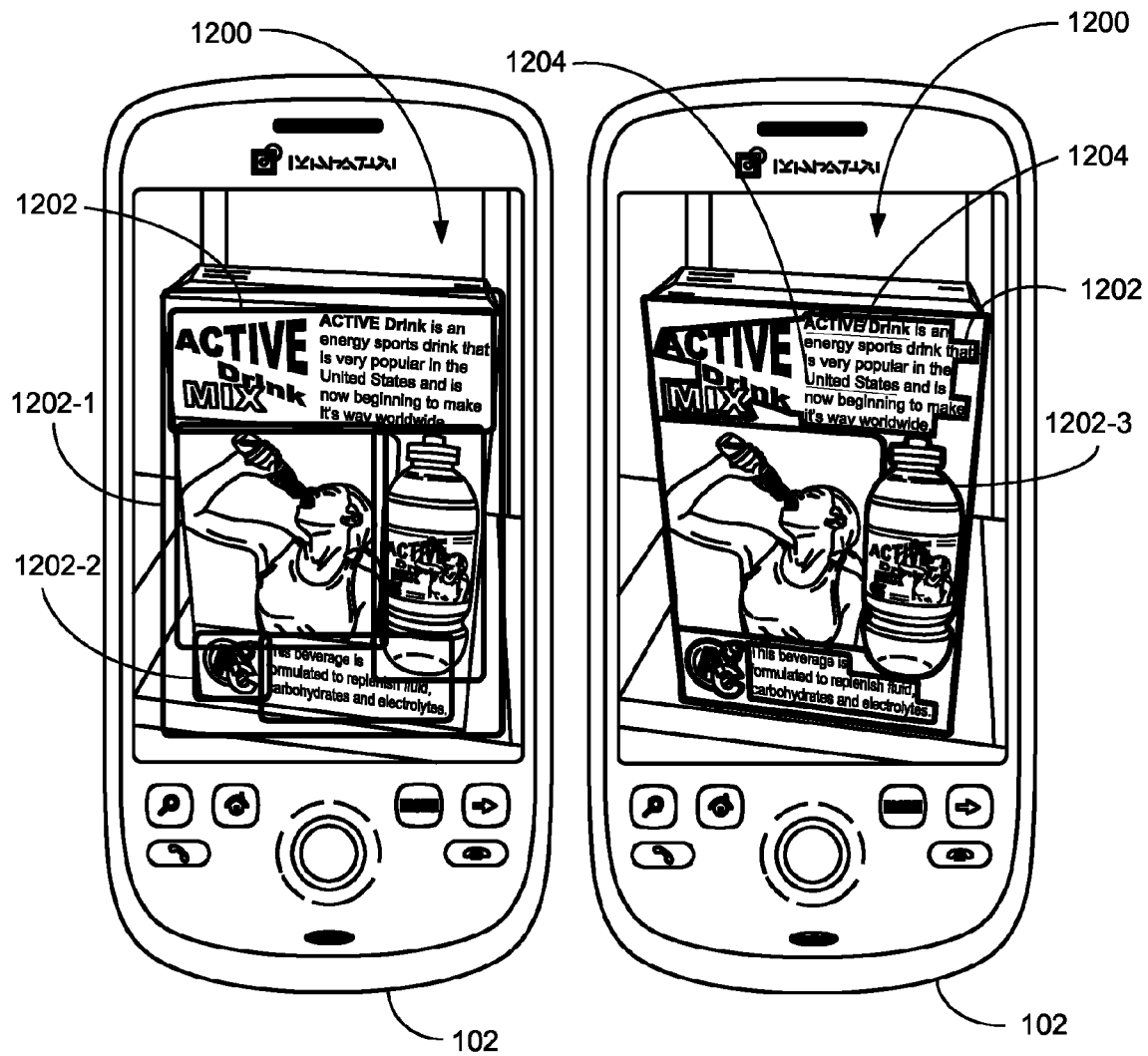
FIGS. 12A and 12B each illustrate a client system with a screen shot of an interactive results document with bounding boxes, in accordance with some embodiments.

In some embodiments, the visual identifier is a bounding box (304). In some embodiments, the bounding box encloses a sub-portion of the visual query as shown in FIG. 12A. The bounding box need not be a square or rectangular box shape but can be any sort of shape including circular, oval, conformal (e.g., to an object in, entity in or region of the visual query), irregular or any other shape as shown in FIG. 12B. For some visual queries, the bounding box outlines the boundary of an identifiable entity in a sub-portion of the visual query (306). In some embodiments, each bounding box includes a user selectable link to one or more search results, where the user selectable link has an activation region corresponding to a sub-portion of the visual query surrounded by the bounding box. When the space inside the bounding box (the activation region of the user selectable link) is selected by the user, search results that correspond to the image in the outlined sub-portion are returned.

Figure 14:
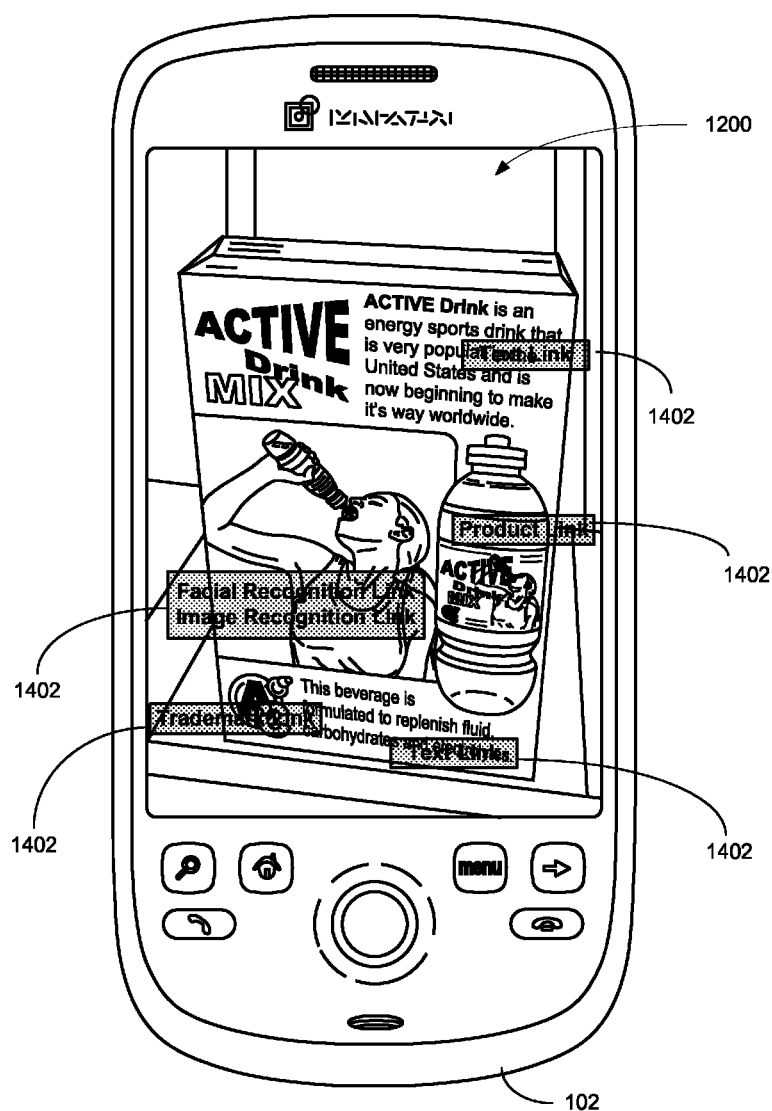
FIG. 14 illustrates a client system with a screen shot of an interactive results document with labels, in accordance with some embodiments.

In some embodiments, the visual identifier is a label (307) as shown in FIG. 14. In some embodiments, label includes at least one term associated with the image in the respective sub-portion of the visual query. Each label is formatted for presentation in the interactive results document on or near the respective sub-portion. In some embodiments, the labels are color coded.

Figure 13:
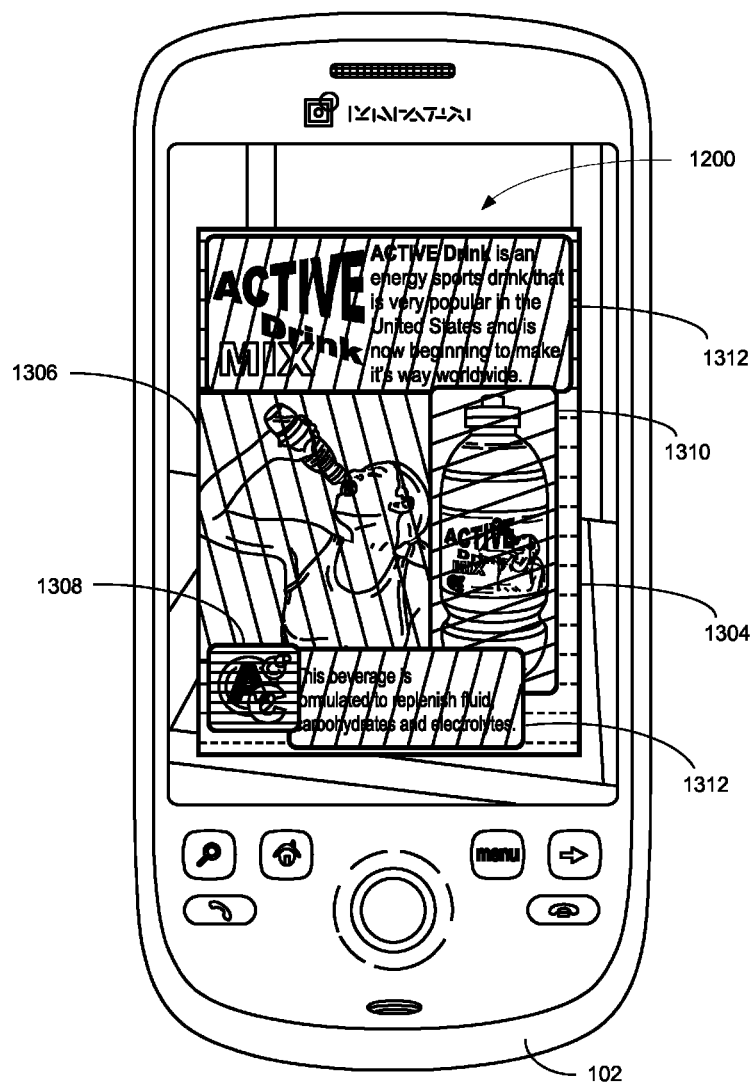
FIG. 13 illustrates a client system with a screen shot of an interactive results document that is coded by type, in accordance with some embodiments.

In some embodiments, each respective visual identifier is formatted for presentation in a visually distinctive manner in accordance with a type of recognized entity in the respective sub-portion of the visual query. For example, as shown in FIG. 13, bounding boxes around a product, a person, a trademark, and the two textual areas are each presented with distinct cross-hatching patterns, representing differently colored transparent bounding boxes. In some embodiments, the visual identifiers are formatted for presentation in visually distinctive manners such as overlay color, overlay pattern, label background color, label background pattern, label font color, and border color.

In some embodiments, the user selectable link in the interactive results document is a link to a document or object that contains one or more results related to the corresponding sub-portion of the visual query (308). In some embodiments, at least one search result includes data related to the corresponding sub-portion of the visual query. As such, when the user selects the selectable link associated with the respective sub-portion, the user is directed to the search results corresponding to the recognized entity in the respective sub-portion of the visual query.

For example, when a visual query is a photograph of a bar code, there are typically portions of the photograph that are irrelevant parts of the packaging upon which the bar code is affixed. In some implementations, the interactive results document includes a bounding box around only the bar code. When the user selects inside the outlined bar code bounding box, the bar code search result is displayed. The bar code search result may include one result, the name of the product corresponding to that bar code, or the bar code results may include several results such as a variety of places in which that product can be purchased, reviewed, etc.

In some embodiments, when the sub-portion of the visual query corresponding to a respective visual identifier contains text comprising one or more terms, the search results corresponding to the respective visual identifier include results from a term query search on at least one of the terms in the text. In some embodiments, when the sub-portion of the visual query corresponding to a respective visual identifier contains a person's face for which at least one match (i.e., search result) is found that meets predefined reliability (or other) criteria, the search results corresponding to the respective visual identifier include one or more of: name, handle, contact information, account information, address information, current location of a related mobile device associated with the person whose face is contained in the selectable sub-portion, other images of the person whose face is contained in the selectable sub-portion, and potential image matches for the person's face. In some embodiments, when the sub-portion of the visual query corresponding to a respective visual identifier contains a product for which at least one match (i.e., search result) is found that meets predefined reliability (or other) criteria, the search results corresponding to the respective visual identifier include one or more of: product information, a product review, an option to initiate purchase of the product, an option to initiate a bid on the product, a list of similar products, and a list of related products.

Optionally, a respective user selectable link in the interactive results document includes anchor text, which is displayed in the document without having to activate the link. The anchor text provides information, such as a key word or term, related to the information obtained when the link is activated. Anchor text is typically displayed as part of the label (307), or in a portion of a bounding box (304), or as additional information displayed when a user hovers a cursor over a user selectable link for a pre-determined period of time such as 1 second.

Optionally, a respective user selectable link in the interactive results document is a link to a search engine for searching for information or documents corresponding to a text-based query (sometimes herein called a term query). Activation of the link causes execution of the search by the search engine, where the query and the search engine are specified by the link (e.g., the search engine is specified by a URL in the link and the text-based search query is specified by a URL parameter of the link), with results returned to the client system. Optionally, the link in this example includes anchor text specifying the text or terms in the search query.

In some embodiments, the interactive results document produced in response to a visual query can include a plurality of links that correspond to results from the same search system. For example, a visual query may be an image or picture of a group of people. In some implementations, the interactive results document includes a bounding box around each person, which when activated returns results from the facial recognition search system for the face in the selected bounding box. For some visual queries, a plurality of links in the interactive results document corresponds to search results from more than one search system (310). For example, if a picture of a person and a dog was submitted as the visual query, bounding boxes in the interactive results document may outline the person and the dog separately. When the person (in the interactive results document) is selected, search results from the facial recognition search system are retuned, and when the dog (in the interactive results document) is selected, results from the image-to-terms search system are returned. For some visual queries, the interactive results document contains an OCR result and an image match result (312). For example, if a picture of a person standing next to a sign were submitted as a visual query, the interactive results document may include visual identifiers for the person and for the text in the sign. Similarly, if a scan of a magazine was used as the visual query, the interactive results document may include visual identifiers for photographs or trademarks in advertisements on the page as well as a visual identifier for the text of an article also on that page.

Figure 15:
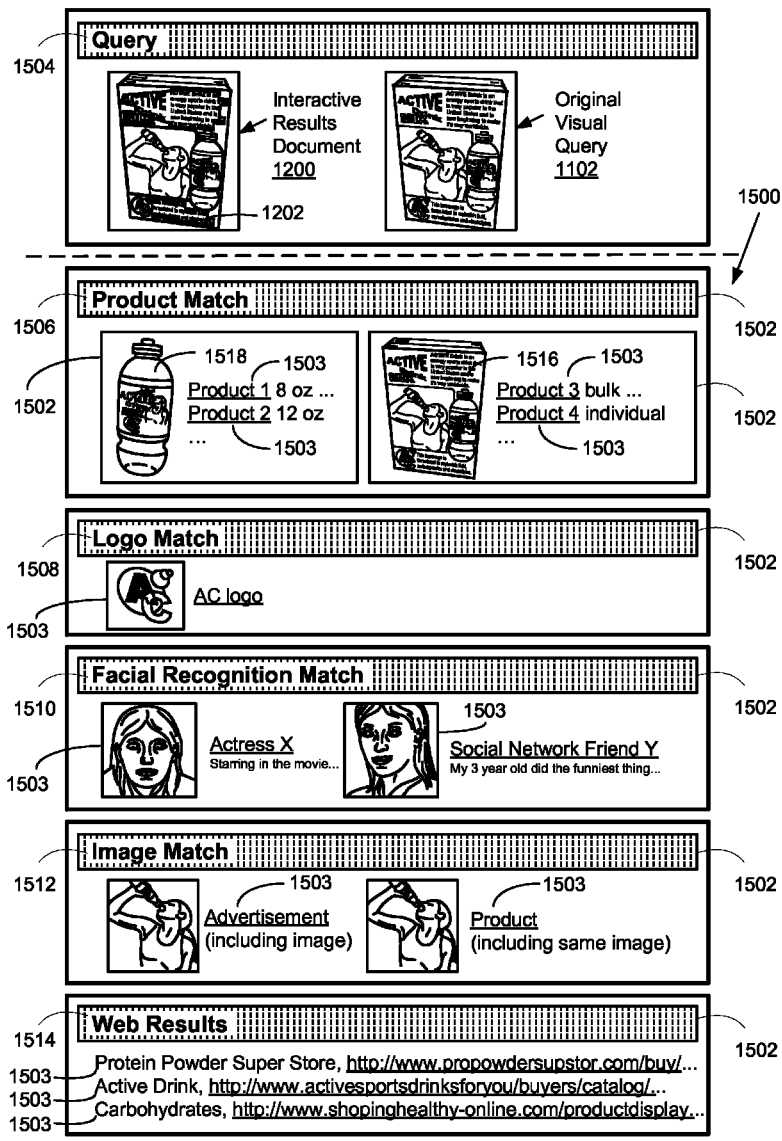
FIG. 15 illustrates a screen shot of an interactive results document and visual query displayed concurrently with a results list, in accordance with some embodiments.

After the interactive results document has been created, it is sent to the client system (314). In some embodiments, the interactive results document (e.g., document 1200, FIG. 15) is sent in conjunction with a list of search results from one or more parallel search systems, as discussed above with reference to FIG. 2. In some embodiments, the interactive results document is displayed at the client system above or otherwise adjacent to a list of search results from one or more parallel search systems (315) as shown in FIG. 15.

Optionally, the user will interact with the results document by selecting a visual identifier in the results document. The server system receives from the client system information regarding the user selection of a visual identifier in the interactive results document (316). As discussed above, in some embodiments, the link is activated by selecting an activation region inside a bounding box. In other embodiments, the link is activated by a user selection of a visual identifier of a sub-portion of the visual query, which is not a bounding box. In some embodiments, the linked visual identifier is a hot button, a label located near the sub-portion, an underlined word in text, or other representation of an object or subject in the visual query.

In embodiments where the search results list is presented with the interactive results document (315), when the user selects a user selectable link (316), the search result in the search results list corresponding to the selected link is identified. In some embodiments, the cursor will jump or automatically move to the first result corresponding to the selected link. In some embodiments in which the display of the client 102 is too small to display both the interactive results document and the entire search results list, selecting a link in the interactive results document causes the search results list to scroll or jump so as to display at least a first result corresponding to the selected link. In some other embodiments, in response to user selection of a link in the interactive results document, the results list is reordered such that the first result corresponding to the link is displayed at the top of the results list.

In some embodiments, when the user selects the user selectable link (316) the visual query server system sends at least a subset of the results, related to a corresponding sub-portion of the visual query, to the client for display to the user (318). In some embodiments, the user can select multiple visual identifiers concurrently and will receive a subset of results for all of the selected visual identifiers at the same time. In other embodiments, search results corresponding to the user selectable links are preloaded onto the client prior to user selection of any of the user selectable links so as to provide search results to the user virtually instantaneously in response to user selection of one or more links in the interactive results document.

Figure 4:
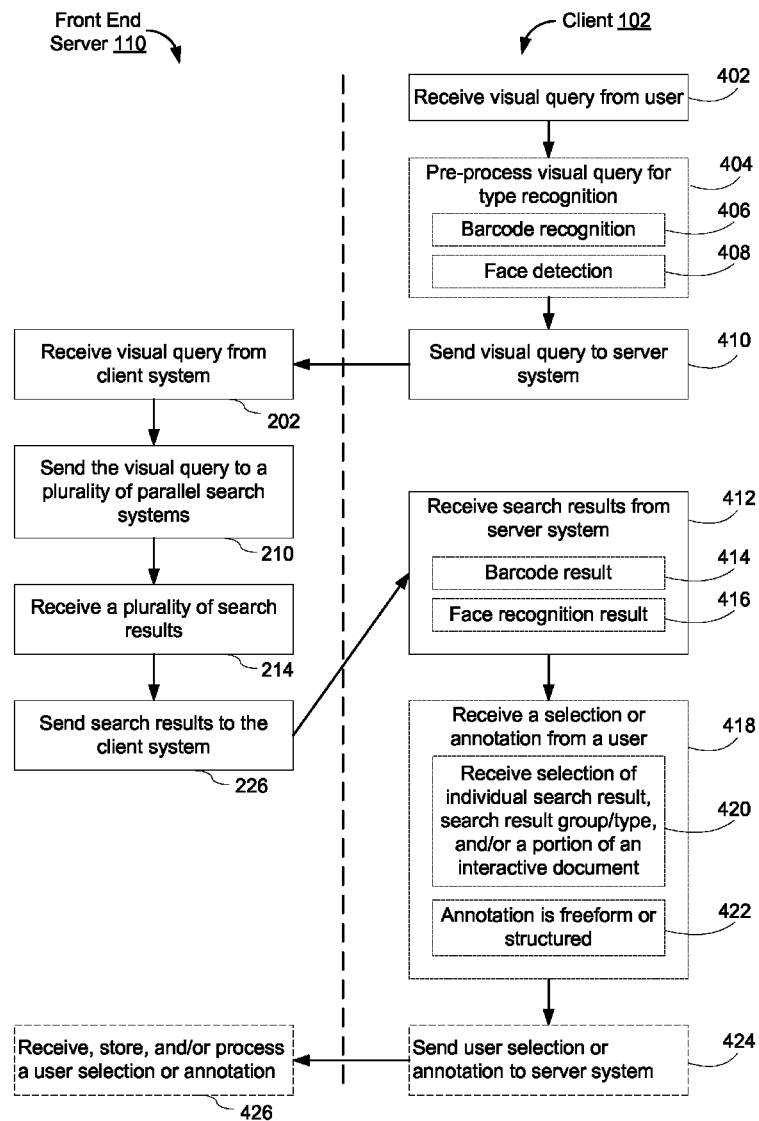
FIG. 4 is a flow diagram illustrating the communications between a client and a visual query server system, in accordance with some embodiments.

FIG. 4 is a flow diagram illustrating the communications between a client and a visual query server system. The client 102 receives a visual query from a user/querier (402). In some embodiments, visual queries can only be accepted from users who have signed up for or "opted in" to the visual query system. In some embodiments, searches for facial recognition matches are only performed for users who have signed up for the facial recognition visual query system, while other types of visual queries are performed for anyone regardless of whether they have "opted in" to the facial recognition portion.

As explained above, the format of the visual query can take many forms. The visual query will likely contain one or more subjects located in sub-portions of the visual query document. For some visual queries, the client system 102 performs type recognition pre-processing on the visual query (404). In some embodiments, the client system 102 searches for particular recognizable patterns in this pre-processing system. For example, for some visual queries the client recognizes colors. In another example, for some visual queries the client recognizes that a particular sub-portion is likely to contain text (because that area is made up of small dark characters surrounded by light space etc.) The client contains any number of pre-processing type recognizers, or type recognition modules. In some embodiments, the client has a type recognition module (barcode recognition 406) for recognizing bar codes. It may do so by recognizing the distinctive striped pattern in a rectangular area. In some embodiments, the client has a type recognition module (face detection 408) for recognizing that a particular subject or sub-portion of the visual query is likely to contain a face.

In some embodiments, the recognized "type" is returned to the user for verification. For example, the client system 102 may return a message stating "a bar code has been found in your visual query, are you interested in receiving bar code query results?" In some embodiments, the message indicates the sub-portion of the visual query where the type has been found. In some embodiments, this presentation is similar to the interactive results document discussed with reference to FIG. 3. For example, it may outline a sub-portion of the visual query and indicate that the sub-portion is likely to contain a face, and ask the user if they are interested in receiving facial recognition results.

After the client 102 performs the optional pre-processing of the visual query, the client sends the visual query to the visual query server system 106, specifically to the front end visual query processing server 110. In some embodiments, if pre-processing produced relevant results, i.e., if one of the type recognition modules produced results above a certain threshold, indicating that the query or a sub-portion of the query is likely to be of a particular type (face, text, barcode etc.), the client will pass along information regarding the results of the pre-processing. For example, the client may indicate that the face recognition module is 75% sure that a particular sub-portion of the visual query contains a face. More generally, the pre-processing results, if any, include one or more subject type values (e.g., bar code, face, text, etc.). Optionally, the pre-processing results sent to the visual query server system include one or more of: for each subject type value in the pre-processing results, information identifying a sub-portion of the visual query corresponding to the subject type value, and for each subject type value in the pre-processing results, a confidence value indicating a level of confidence in the subject type value and/or the identification of a corresponding sub-portion of the visual query.

The front end server 110 receives the visual query from the client system (202). Optionally, the visual query received contains the pre-processing information discussed above. As described above, the front end server sends the visual query to a plurality of parallel search systems (210). In some implementations, when the front end server 110 receives pre-processing information regarding the likelihood that a sub-portion contained a subject of a certain type, the front end server passes this information along to one or more of the parallel search systems. For example, it may pass on the information that a particular sub-portion is likely to be a face so that the facial recognition search system 112-A can process that subsection of the visual query first. Similarly, the same information (that a particular sub-portion is likely to be a face) is used by the other parallel search systems to ignore that sub-portion or analyze other sub-portions first. In some embodiments, the front end server will not pass on the pre-processing information to the parallel search systems, but will instead use this information to augment the way in which it processes the results received from the parallel search systems.

As explained with reference to FIG. 2, for at some visual queries, the front end server 110 receives a plurality of search results from the parallel search systems (214). The front end server then perform a variety of ranking and filtering operations, and creates an interactive search result document as explained with reference to FIGS. 2 and 3. If the front end server 110 received pre-processing information regarding the likelihood that a sub-portion contained a subject of a certain type, it may filter and order the search results by giving preference to those results that match the pre-processed recognized subject type. If the user indicated that a particular type of result was requested, the front end server will take the user's requests into account when processing the results. For example, the front end server filters out all other results if the user only requested bar code information, or the front end server list all results pertaining to the requested type prior to listing other results. If an interactive visual query document is returned, the server may pre-search the links associated with the type of result the user indicated interest in, while only providing links for performing related searches for the other subjects indicated in the interactive results document. Then the front end server 110 sends the search results to the client system (226).

The client 102 receives the results from the server system (412). When applicable, these results will include the results that match the type of result found in the pre-processing stage. For example, in some embodiments they will include one or more bar code results (414) or one or more facial recognition results (416). If the client's pre-processing modules had indicated that a particular type of result was likely, and that result was found, the found results of that type will be listed prominently.

Optionally the user will select or annotate one or more of the results (418). The user may select one search result, may select a particular type of search result, and/or may select a portion of an interactive results document (420). Selection of a result is implicit feedback that the returned result was relevant to the query. Such feedback information can be utilized in future query processing operations. An annotation provides explicit feedback about the returned result that can also be utilized in future query processing operations. Annotations take the form of corrections of portions of the returned result (like a correction to a mis-OCRed word) or a separate annotation (either free form or structured.)

The user's selection of one search result, generally selecting the "correct" result from several of the same type (e.g., choosing the correct result from a facial recognition server), is a process that is referred to as a selection among interpretations. The user's selection of a particular type of search result, generally selecting the result "type" of interest from several different types of returned results (e.g., choosing the OCRed text of an article in a magazine rather than the visual results for the advertisements also on the same page), is a process that is referred to as disambiguation of intent. A user may similarly select particular linked words (such as recognized named entities) in an OCRed document as explained in detail with reference to FIG. 8.

The user may alternatively or additionally wish to annotate particular search results. This annotation may be done in freeform style or in a structured format (422). The annotations may be descriptions of the result or may be reviews of the result. For example, they may indicate the name of subject(s) in the result, or they could indicate "this is a good book" or "this product broke within a year of purchase." Another example of an annotation is a user-drawn bounding box around a sub-portion of the visual query and user-provided text identifying the object or subject inside the bounding box. User annotations are explained in more detail with reference to FIG. 5.

The user selections of search results and other annotations are sent to the server system (424). The front end server 110 receives the selections and annotations and further processes them (426). If the information was a selection of an object, sub-region or term in an interactive results document, further information regarding that selection may be requested, as appropriate. For example, if the selection was of one visual result, more information about that visual result would be requested. If the selection was a word (either from the OCR server or from the Image-to-Terms server) a textual search of that word would be sent to the term query server system 118. If the selection was of a person from a facial image recognition search system, that person's profile would be requested. If the selection was for a particular portion of an interactive search result document, the underlying visual query results would be requested.

If the server system receives an annotation, the annotation is stored in a query and annotation database 116, explained with reference to FIG. 5. Then the information from the annotation database 116 is periodically copied to individual annotation databases for one or more of the parallel server systems, as discussed below with reference to FIGS. 7-10.

Figure 5:
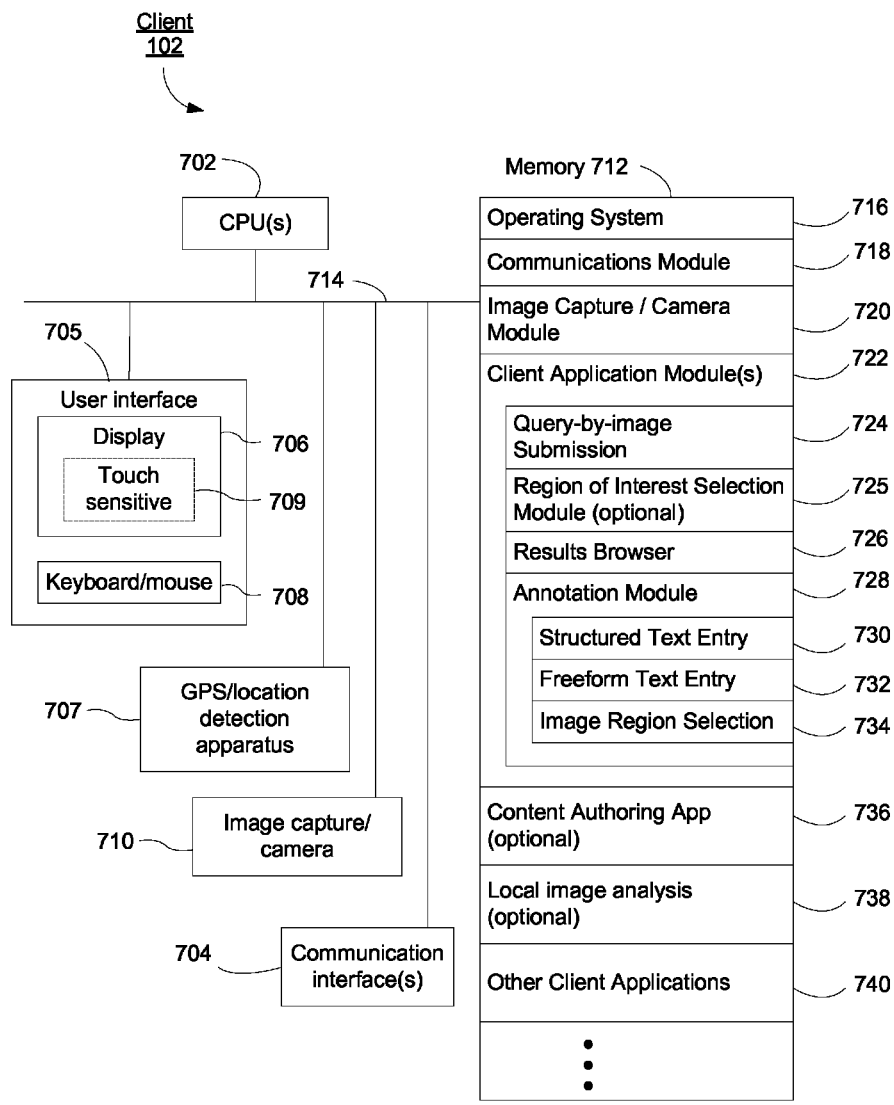
FIG. 5 is a block diagram illustrating a client system, in accordance with some embodiments.

FIG. 5 is a block diagram illustrating a client system 102 in accordance with some embodiments. The client system 102 typically includes one or more processing units (CPU's) 702, one or more network or other communications interfaces 704, memory 712, and one or more communication buses 714 for interconnecting these components. The communication buses 714 optionally include circuitry (sometimes called a chipset) that interconnects and controls communications between system components. The client system 102 includes a user interface 705. The user interface 705 includes a display device 706 and optionally includes an input means such as a keyboard, mouse, or other input buttons 708. Alternatively or in addition the display device 706 includes a touch sensitive surface 709, in which case the display 706/709 is a touch sensitive display. In client systems that have a touch sensitive display 706/709, a physical keyboard is optional (e.g., a soft keyboard may be displayed when keyboard entry is needed). Furthermore, some client systems use a microphone and voice recognition to supplement or replace the keyboard. Optionally, the client 102 includes a GPS (global positioning satellite) receiver, or other location detection apparatus 707 for determining the location of the client system 102. In some embodiments, visual query search services are provided that require the client system 102 to provide the visual query server system to receive location information indicating the location of the client system 102.

The client system 102 also includes an image capture device 710 such as a camera or scanner. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a non-transitory computer readable storage medium. In some embodiments, memory 712 or the computer readable storage medium of memory 712 stores the following programs, modules and data structures, or a subset thereof:

- an operating system 716 that includes procedures for handling various basic system services and for performing hardware dependent tasks;
- a network communication module 718 that is used for connecting the client system 102 to other computers via the one or more communication network interfaces 704 (wired or wireless) and one or more communication networks, such as the Internet, other wide area networks, local area networks, metropolitan area networks, and so on;
- a image capture module 720 for processing a respective image captured by the image capture device/camera 710, where the respective image may be sent (e.g., by a client application module) as a visual query to the visual query server system;
- one or more client application modules 722 for handling various aspects of querying by image, including but not limited to: a query-by-image submission module 724 for submitting visual queries to the visual query server system; optionally a region of interest selection module 725 that detects a selection (such as a gesture on the touch sensitive display 706/709) of a region of interest in an image and prepares that region of interest as a visual query; a results browser 726 for displaying the results of the visual query; and optionally an annotation module 728 with optional modules for structured annotation text entry 730 such as filling in a form or for freeform annotation text entry 732, which can accept annotations from a variety of formats, and an image region selection module 734 (sometimes referred to herein as a result selection module) which allows a user to select a particular sub-portion of an image for annotation;
- an optional content authoring application(s) 736 that allow a user to author a visual query by creating or editing an image rather than just capturing one via the image capture device 710; optionally, one or such applications 736 may include instructions that enable a user to select a sub-portion of an image for use as a visual query;
- an optional local image analysis module 738 that preprocesses the visual query before sending it to the visual query server system. The local image analysis may recognize particular types of images, or sub-regions within an image. Examples of image types that may be recognized by such modules 738 include one or more of: facial type (facial image recognized within visual query), bar code type (bar code recognized within visual query), and text type (text recognized within visual query); and
- additional optional client applications 740 such as an email application, a phone application, a browser application, a mapping application, instant messaging application, social networking application etc. In some embodiments, the application corresponding to an appropriate actionable search result can be launched or accessed when the actionable search result is selected.

Optionally, the image region selection module 734 which allows a user to select a particular sub-portion of an image for annotation, also allows the user to choose a search result as a "correct" hit without necessarily further annotating it. For example, the user may be presented with a top N number of facial recognition matches and may choose the correct person from that results list. For some search queries, more than one type of result will be presented, and the user will choose a type of result. For example, the image query may include a person standing next to a tree, but only the results regarding the person is of interest to the user. Therefore, the image selection module 734 allows the user to indicate which type of image is the "correct" type—i.e., the type he is interested in receiving. The user may also wish to annotate the search result by adding personal comments or descriptive words using either the annotation text entry module 730 (for filling in a form) or freeform annotation text entry module 732.

In some embodiments, the optional local image analysis module 738 is a portion of the client application (108, FIG. 1). Furthermore, in some embodiments the optional local image analysis module 738 includes one or more programs to perform local image analysis to pre-process or categorize the visual query or a portion thereof. For example, the client application 722 may recognize that the image contains a bar code, a face, or text, prior to submitting the visual query to a search engine. In some embodiments, when the local image analysis module 738 detects that the visual query contains a particular type of image, the module asks the user if they are interested in a corresponding type of search result. For example, the local image analysis module 738 may detect a face based on its general characteristics (i.e., without determining which person's face) and provides immediate feedback to the user prior to sending the query on to the visual query server system. It may return a result like, "A face has been detected, are you interested in getting facial recognition matches for this face?" This may save time for the visual query server system (106, FIG. 1). For some visual queries, the front end visual query processing server (110, FIG. 1) only sends the visual query to the search system 112 corresponding to the type of image recognized by the local image analysis module 738. In other embodiments, the visual query to the search system 112 may send the visual query to all of the search systems 112A-N, but will rank results from the search system 112 corresponding to the type of image recognized by the local image analysis module 738. In some embodiments, the manner in which local image analysis impacts on operation of the visual query server system depends on the configuration of the client system, or configuration or processing parameters associated with either the user or the client system. Furthermore, the actual content of any particular visual query and the results produced by the local image analysis may cause different visual queries to be handled differently at either or both the client system and the visual query server system.

In some embodiments, bar code recognition is performed in two steps, with analysis of whether the visual query includes a bar code performed on the client system at the local image analysis module 738. Then the visual query is passed to a bar code search system only if the client determines the visual query is likely to include a bar code. In other embodiments, the bar code search system processes every visual query.

Optionally, the client system 102 includes additional client applications 740.

Figure 6:
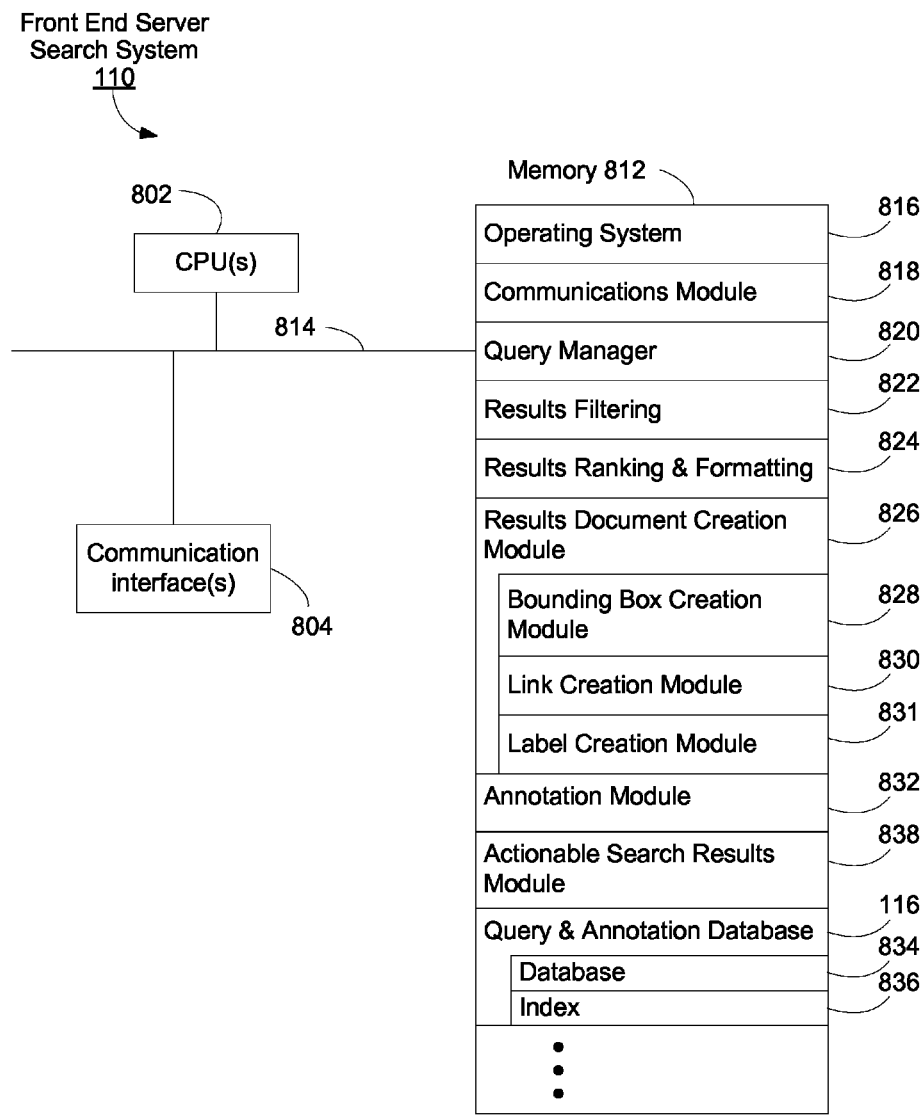
FIG. 6 is a block diagram illustrating a front end visual query processing server system, in accordance with some embodiments.

FIG. 6 is a block diagram illustrating a front end visual query processing server system 110 in accordance with some embodiments. The front end server 110 typically includes one or more processing units (CPU's) 802, one or more network or other communications interfaces 804, memory 812, and one or more communication buses 814 for interconnecting these components. The communication buses 814 optionally include circuitry (sometimes called a chipset) that interconnects and controls communications between system components. Memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices remotely located from the CPU(s) 802. Memory 812, or alternately the non-volatile memory device(s) within memory 812, comprises a non-transitory computer readable storage medium. In some embodiments, memory 812 or the computer readable storage medium of memory 812 stores the following programs, modules and data structures, or a subset thereof:

- an operating system 816 that includes procedures for handling various basic system services and for performing hardware dependent tasks;
- a network communication module 818 that is used for connecting the front end server system 110 to other computers via the one or more communication network interfaces 804 (wired or wireless) and one or more communication networks, such as the Internet, other wide area networks, local area networks, metropolitan area networks, and so on;
- a query manager 820 for handling the incoming visual queries from the client system 102 and sending them to two or more parallel search systems; as described elsewhere in this document, in some special situations a visual query may be directed to just one of the search systems, such as when the visual query includes an client-generated instruction (e.g., "facial recognition search only");
- a results filtering module 822 for optionally filtering the results from the one or more parallel search systems and sending the top or "relevant" results to the client system 102 for presentation;
- a results ranking and formatting module 824 for optionally ranking the results from the one or more parallel search systems and for formatting the results for presentation;
- a results document creation module 826, is used when appropriate, to create an interactive search results document; module 826 may include sub-modules, including but not limited to a bounding box creation module 828 and a link creation module 830;
- a label creation module 831 for creating labels that are visual identifiers of respective sub-portions of a visual query;
- an annotation module 832 for receiving annotations from a user and sending them to an annotation database 116;
- an actionable search results module 838 for generating, in response to a visual query, one or more actionable search result elements, each configured to launch a client-side action; examples of actionable search result elements are buttons to initiate a telephone call, to initiate email message, to map an address, to make a restaurant reservation, and to provide an option to purchase a product; and a query and annotation database 116 which comprises the database itself 834 and an index to the database 836.

The results ranking and formatting module 824 ranks the results returned from the one or more parallel search systems (112-A-112-N, FIG. 1). As already noted above, for some visual queries, only the results from one search system may be relevant. In such an instance, only the relevant search results from that one search system are ranked. For some visual queries, several types of search results may be relevant. In these instances, in some embodiments, the results ranking and formatting module 824 ranks all of the results from the search system having the most relevant result (e.g., the result with the highest relevance score) above the results for the less relevant search systems. In other embodiments, the results ranking and formatting module 824 ranks a top result from each relevant search system above the remaining results. In some embodiments, the results ranking and formatting module 824 ranks the results in accordance with a relevance score computed for each of the search results. For some visual queries, augmented textual queries are performed in addition to the searching on parallel visual search systems. In some embodiments, when textual queries are also performed, their results are presented in a manner visually distinctive from the visual search system results.

The results ranking and formatting module 824 also formats the results. In some embodiments, the results are presented in a list format. In some embodiments, the results are presented by means of an interactive results document. In some embodiments, both an interactive results document and a list of results are presented. In some embodiments, the type of query dictates how the results are presented. For example, if more than one searchable subject is detected in the visual query, then an interactive results document is produced, while if only one searchable subject is detected the results will be displayed in list format only.

The results document creation module 826 is used to create an interactive search results document. The interactive search results document may have one or more detected and searched subjects. The bounding box creation module 828 creates a bounding box around one or more of the searched subjects. The bounding boxes may be rectangular boxes, or may outline the shape(s) of the subject(s). The link creation module 830 creates links to search results associated with their respective subject in the interactive search results document. In some embodiments, clicking within the bounding box area activates the corresponding link inserted by the link creation module.

The query and annotation database 116 contains information that can be used to improve visual query results. In some embodiments, the user may annotate the image after the visual query results have been presented. Furthermore, in some embodiments the user may annotate the image before sending it to the visual query search system. Pre-annotation may help the visual query processing by focusing the results, or running text based searches on the annotated words in parallel with the visual query searches. In some embodiments, annotated versions of a picture can be made public (e.g., when the user has given permission for publication, for example by designating the image and annotation(s) as not private), so as to be returned as a potential image match hit. For example, if a user takes a picture of a flower and annotates the image by giving detailed genus and species information about that flower, the user may want that image to be presented to anyone who performs a visual query research looking for that flower. In some embodiments, the information from the query and annotation database 116 is periodically pushed to the parallel search systems 112, which incorporate relevant portions of the information (if any) into their respective individual databases 114.

Figure 7:
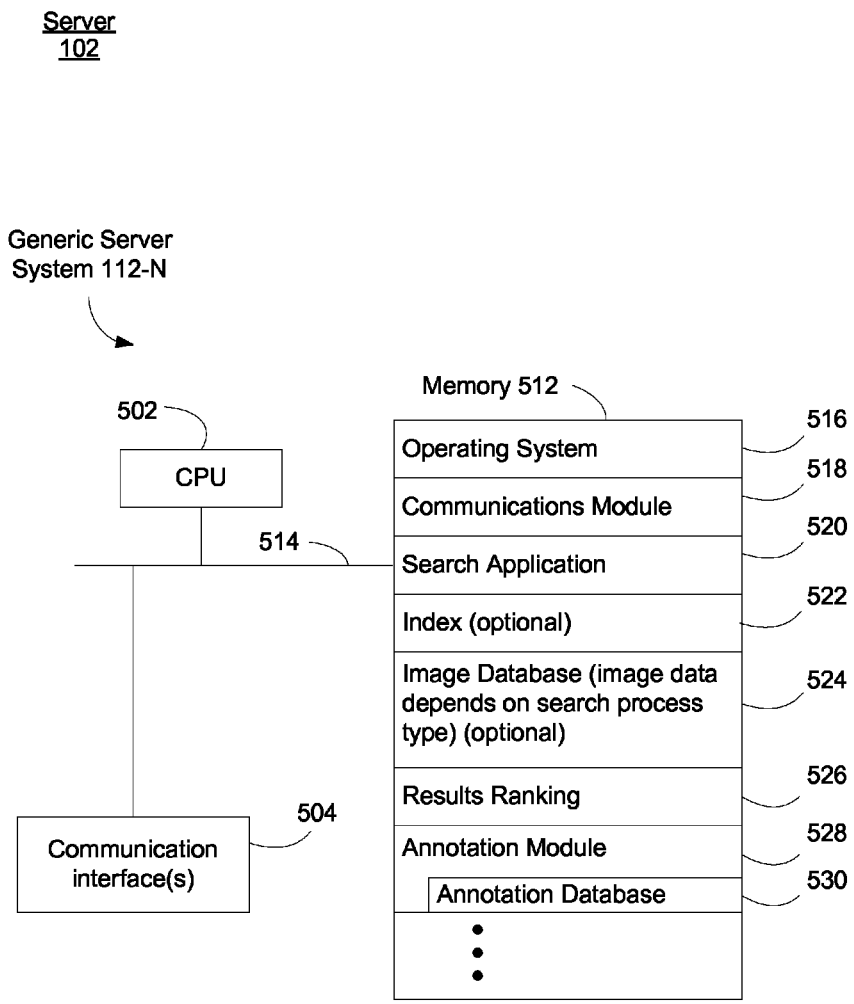
FIG. 7 is a block diagram illustrating a generic one of the parallel search systems utilized to process a visual query, in accordance with some embodiments.

FIG. 7 is a block diagram illustrating one of the parallel search systems utilized to process a visual query. FIG. 7 illustrates a "generic" server system 112-N in accordance with some embodiments. This server system is generic only in that it represents any one of the visual query search servers 112-N. The generic server system 112-N typically includes one or more processing units (CPU's) 502, one or more network or other communications interfaces 504, memory 512, and one or more communication buses 514 for interconnecting these components. The communication buses 514 optionally include circuitry (sometimes called a chipset) that interconnects and controls communications between system components. Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. Memory 512, or alternately the non-volatile memory device(s) within memory 512, comprises a non-transitory computer readable storage medium. In some embodiments, memory 512 or the computer readable storage medium of memory 512 stores the following programs, modules and data structures, or a subset thereof:

an operating system 516 that includes procedures for handling various basic system services and for performing hardware dependent tasks;

a network communication module 518 that is used for connecting the generic server system 112-N to other computers via the one or more communication network interfaces 504 (wired or wireless) and one or more communication networks, such as the Internet, other wide area networks, local area networks, metropolitan area networks, and so on;

a search application 520 specific to the particular server system, it may for example be a bar code search application, a color recognition search application, a product recognition search application, an object-or-object category search application, or the like;

an optional index 522 if the particular search application utilizes an index;

an optional image database 524 for storing the images relevant to the particular search application, where the image data stored, if any, depends on the search process type;

an optional results ranking module 526 (sometimes called a relevance scoring module) for ranking the results from the search application, the ranking module may assign a relevancy score for each result from the search application, and if no results reach a pre-defined minimum score, may return a null or zero value score to the front end visual query processing server indicating that the results from this server system are not relevant; and an annotation module 528 for receiving annotation information from an annotation database (116, FIG. 1) determining if any of the annotation information is relevant to the particular search application and incorporating any determined relevant portions of the annotation information into the respective annotation database 530.

Figure 8:
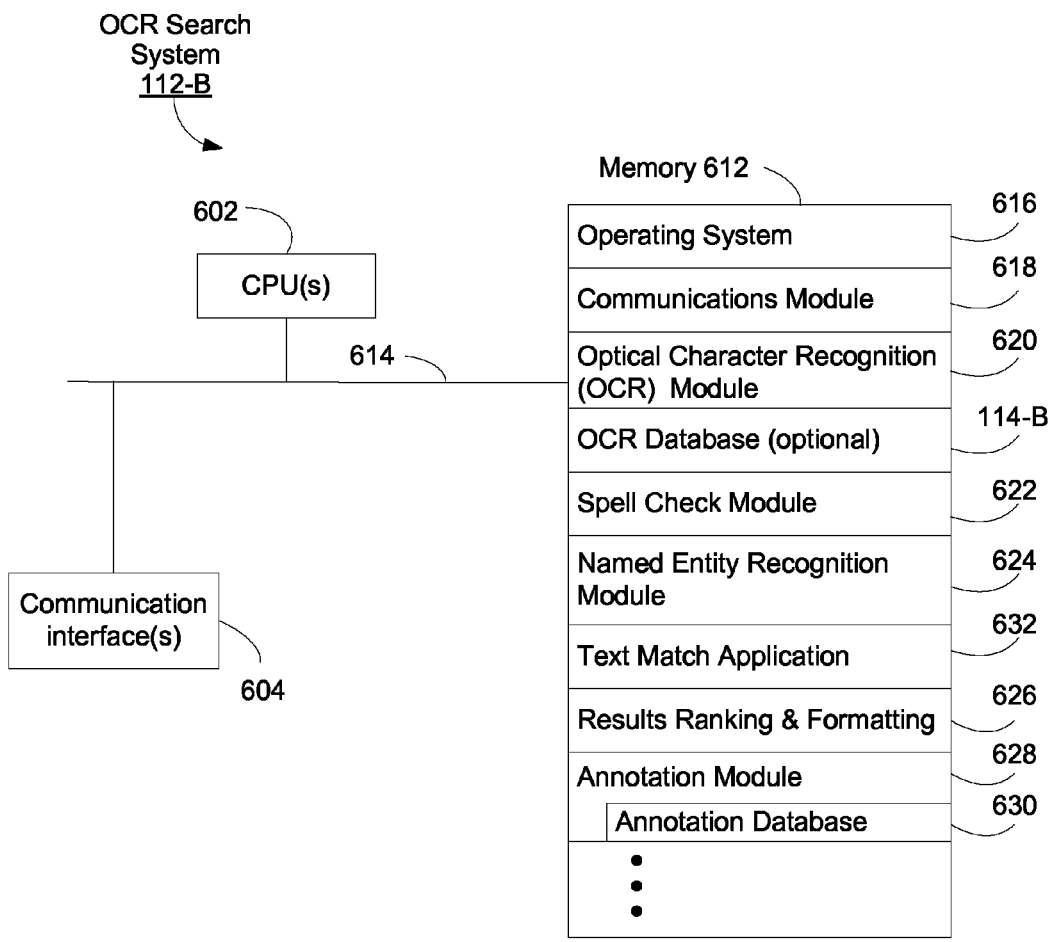
FIG. 8 is a block diagram illustrating an OCR search system utilized to process a visual query, in accordance with some embodiments.

FIG. 8 is a block diagram illustrating an OCR search system 112-B utilized to process a visual query in accordance with some embodiments. The OCR search system 112-B typically includes one or more processing units (CPU's) 602, one or more network or other communications interfaces 604, memory 612, and one or more communication buses 614 for interconnecting these components. The communication buses 614 optionally include circuitry (sometimes called a chipset) that interconnects and controls communications between system components. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a non-transitory computer readable storage medium. In some embodiments, memory 612 or the computer readable storage medium of memory 612 stores the following programs, modules and data structures, or a subset thereof:

- an operating system 616 that includes procedures for handling various basic system services and for performing hardware dependent tasks;
- a network communication module 618 that is used for connecting the OCR search system 112-B to other computers via the one or more communication network interfaces 604 (wired or wireless) and one or more communication networks, such as the Internet, other wide area networks, local area networks, metropolitan area networks, and so on;
- an Optical Character Recognition (OCR) module 620 which tries to recognize text in the visual query, and converts the images of letters into characters;
- an optional OCR database 114-B which is utilized by the OCR module 620 to recognize particular fonts, text patterns, and other characteristics unique to letter recognition;
- an optional spell check module 622 which improves the conversion of images of letters into characters by checking the converted words against a dictionary and replacing potentially mis-converted letters in words that otherwise match a dictionary word;
- an optional named entity recognition module 624 which searches for named entities within the converted text, sends the recognized named entities as terms in a term query to the term query server system (118, FIG. 1), and provides the results from the term query server system as links embedded in the OCRed text associated with the recognized named entities;
- an optional text match application 632 which improves the conversion of images of letters into characters by checking converted segments (such as converted sentences and paragraphs) against a database of text segments and replacing potentially mis-converted letters in OCRed text segments that otherwise match a text match application text segment, in some embodiments the text segment found by the text match application is provided as a link to the user (for example, if the user scanned a page or a portion of a page of the New York Times, the text match application may provide a link to the entire posted article on the New York Times website);
- a results ranking and formatting module 626 for formatting the OCRed results for presentation and formatting optional links to named entities, and also optionally ranking any related results from the text match application; and
- an optional annotation module 628 for receiving annotation information from an annotation database (116, FIG. 1) determining if any of the annotation information is relevant to the OCR search system and incorporating any determined relevant portions of the annotation information into the respective annotation database 630.

Figure 9:
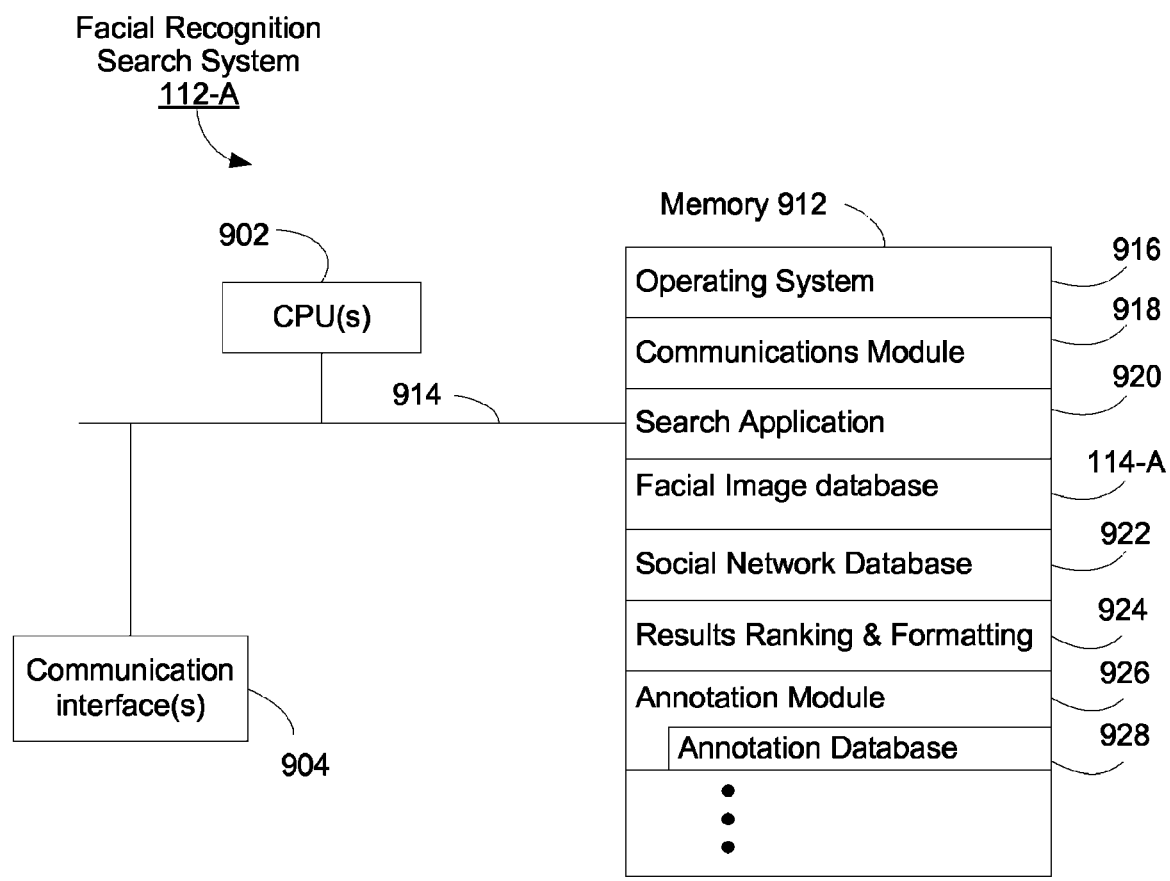
FIG. 9 is a block diagram illustrating a facial recognition search system utilized to process a visual query, in accordance with some embodiments.

FIG. 9 is a block diagram illustrating a facial recognition search system 112-A utilized to process a visual query in accordance with some embodiments. The facial recognition search system 112-A typically includes one or more processing units (CPU's) 902, one or more network or other communications interfaces 904, memory 912, and one or more communication buses 914 for interconnecting these components. The communication buses 914 optionally include circuitry (sometimes called a chipset) that interconnects and controls communications between system components. Memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 912 may optionally include one or more storage devices remotely located from the CPU(s) 902. Memory 912, or alternately the non-volatile memory device(s) within memory 912, comprises a non-transitory computer readable storage medium. In some embodiments, memory 912 or the computer readable storage medium of memory 912 stores the following programs, modules and data structures, or a subset thereof:

- an operating system 916 that includes procedures for handling various basic system services and for performing hardware dependent tasks;
- a network communication module 918 that is used for connecting the facial recognition search system 112-A to other computers via the one or more communication network interfaces 904 (wired or wireless) and one or more communication networks, such as the Internet, other wide area networks, local area networks, metropolitan area networks, and so on;
- a facial recognition search application 920 for searching for facial images matching the face(s) presented in the visual query in a facial image database 114-A and searches the social network database 922 for information regarding each match found in the facial image database 114-A.
- a facial image database 114-A for storing one or more facial images for a plurality of users; optionally, the facial image database includes facial images for people other than users, such as family members and others known by users and who have been identified as being present in images included in the facial image database 114-A; optionally, the facial image database includes facial images obtained from external sources, such as vendors of facial images that are legally in the public domain;
- optionally, a social network database 922 which contains information regarding users of the social network such as name, address, occupation, group memberships, social network connections, current GPS location of mobile device, share preferences, interests, age, hometown, personal statistics, work information, etc. as discussed in more detail with reference to FIG. 12A;
- a results ranking and formatting module 924 for ranking (e.g., assigning a relevance and/or match quality score to) the potential facial matches from the facial image database 114-A and formatting the results for presentation; in some embodiments, the ranking or scoring of results utilizes related information retrieved from the aforementioned social network database; in some embodiment, the search formatted results include the potential image matches as well as a subset of information from the social network database; and an annotation module 926 for receiving annotation information from an annotation database (116, FIG. 1) determining if any of the annotation information is relevant to the facial recognition search system and storing any determined relevant portions of the annotation information into the respective annotation database 928.

Figure 10:
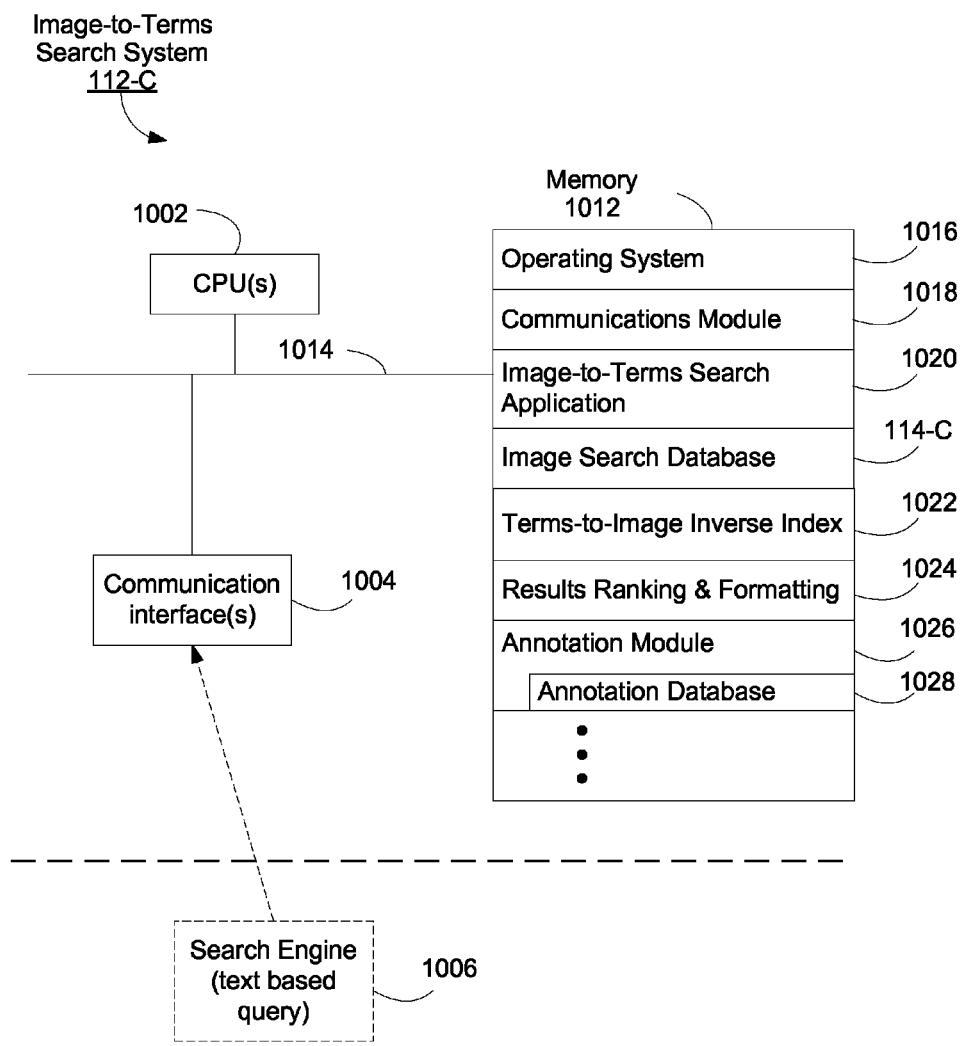
FIG. 10 is a block diagram illustrating an image to terms search system utilized to process a visual query, in accordance with some embodiments.

FIG. 10 is a block diagram illustrating an image-to-terms search system 112-C utilized to process a visual query in accordance with some embodiments. In some embodiments, the image-to-terms search system recognizes objects (instance recognition) in the visual query. In other embodiments, the image-to-terms search system recognizes object categories (type recognition) in the visual query. In some embodiments, the image to terms system recognizes both objects and object-categories. The image-to-terms search system returns potential term matches for images in the visual query. The image-to-terms search system 112-C typically includes one or more processing units (CPU's) 1002, one or more network or other communications interfaces 1004, memory 1012, and one or more communication buses 1014 for interconnecting these components. The communication buses 1014 optionally include circuitry (sometimes called a chipset) that interconnects and controls communications between system components. Memory 1012 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1012 may optionally include one or more storage devices remotely located from the CPU(s) 1002. Memory 1012, or alternately the non-volatile memory device(s) within memory 1012, comprises a non-transitory computer readable storage medium. In some embodiments, memory 1012 or the computer readable storage medium of memory 1012 stores the following programs, modules and data structures, or a subset thereof:

- an operating system 1016 that includes procedures for handling various basic system services and for performing hardware dependent tasks;
- a network communication module 1018 that is used for connecting the image-to-terms search system 112-C to other computers via the one or more communication network interfaces 1004 (wired or wireless) and one or more communication networks, such as the Internet, other wide area networks, local area networks, metropolitan area networks, and so on;
- a image-to-terms search application 1020 that searches for images matching the subject or subjects in the visual query in the image search database 114-C;
- an image search database 114-C which can be searched by the search application 1020 to find images similar to the subject(s) of the visual query;
- a terms-to-image inverse index 1022, which stores the textual terms used by users when searching for images using a text based query search engine 1006;
- a results ranking and formatting module 1024 for ranking the potential image matches and/or ranking terms associated with the potential image matches identified in the terms-to-image inverse index 1022; and
- an annotation module 1026 for receiving annotation information from an annotation database (116, FIG. 1) determining if any of the annotation information is relevant to the image-to terms search system 112-C and storing any determined relevant portions of the annotation information into the respective annotation database 1028.

FIGS. 5-10 are intended more as functional descriptions of various features present in a set of computer systems than as a structural schematic of the embodiments described herein. In practice, and as recognized by those of ordinary skill in the art, items shown separately could be combined and some items could be separated. For example, some items shown separately in these figures could be implemented on single servers and single items could be implemented by one or more servers. The actual number of systems used to implement visual query processing and how features are allocated among them will vary from one implementation to another.

Each of the methods described herein is typically governed by instructions that are stored in a non-transitory computer readable storage medium and that are executed by one or more processors of one or more servers or clients. Furthermore, each of the above identified modules, applications or programs corresponds to a set of instructions, executable by the one or more processors of client system 104, for performing a function described above. The above identified modules or programs (i.e., sets of instructions) need not be implemented as separate software programs, procedures or modules, and thus various subsets of these modules may be combined or otherwise re-arranged in various embodiments. Each of the operations shown in FIGS. 5-10 may correspond to instructions stored in a computer memory or non-transitory computer readable storage medium.

FIG. 11 illustrates a client system 102 with a screen shot of an exemplary visual query 1102. The client system 102 shown in FIG. 11 is a mobile device such as a cellular telephone, portable music player, or portable emailing device. The client system 102 includes a display 706 and one or more input means 708 such the buttons shown in this figure. In some embodiments, the display 706 is a touch sensitive display 709. In embodiments having a touch sensitive display 709, soft buttons displayed on the display 709 may optionally replace some or all of the electromechanical buttons 708. Touch sensitive displays are also helpful in interacting with the visual query results as explained in more detail below. The client system 102 also includes an image capture mechanism such as a camera 710.

FIG. 11 illustrates a visual query 1102 which is a photograph or video frame of a package on a shelf of a store. In the embodiments described here, the visual query is a two dimensional image having a resolution corresponding to the size of the visual query in pixels in each of two dimensions. The visual query 1102 in this example is a two dimensional image of three dimensional objects. The visual query 1102 includes background elements, a product package 1104, and a variety of types of entities on the package including an image of a person 1106, an image of a trademark 1108, an image of a product 1110, and a variety of textual elements 1112.

As explained with reference to FIG. 3, the visual query 1102 is sent to the front end server 110, which sends the visual query 1102 to a plurality of parallel search systems (112A-N), receives the results and creates an interactive results document.

FIGS. 12A and 12B each illustrate a client system 102 with a screen shot of an embodiment of an interactive results document 1200. The interactive results document 1200 includes one or more visual identifiers 1202 of respective sub-portions of the visual query 1102, which each include a user selectable link to a subset of search results. FIGS. 12A and 12B illustrate an interactive results document 1200 with visual identifiers that are bounding boxes 1202 (e.g., bounding boxes 1202-1, 1202-2, 1202-3). In the embodiments shown in FIGS. 12A and 12B, the user activates the display of the search results corresponding to a particular sub-portion by tapping on the activation region inside the space outlined by its bounding box 1202. For example, the user would activate the search results corresponding to the image of the person, by tapping on a bounding box 1306 (FIG. 13) surrounding the image of the person. In other embodiments, the selectable link is selected using a mouse or keyboard rather than a touch sensitive display. In some embodiments, the first corresponding search result is displayed when a user previews a bounding box 1202 (i.e., when the user single clicks, taps once, or hovers a pointer over the bounding box). The user activates the display of a plurality of corresponding search results when the user selects the bounding box (i.e., when the user double clicks, taps twice, or uses another mechanism to indicate selection).

In FIGS. 12A and 12B the visual identifiers are bounding boxes 1202 surrounding sub-portions of the visual query. FIG. 12A illustrates bounding boxes 1202 that are square or rectangular. FIG. 12B illustrates a bounding box 1202 that outlines the boundary of an identifiable entity in the sub-portion of the visual query, such as the bounding box 1202-3 for a drink bottle. In some embodiments, a respective bounding box 1202 includes smaller bounding boxes 1202 within it. For example, in FIGS. 12A and 12B, the bounding box identifying the package 1202-1 surrounds the bounding box identifying the trademark 1202-2 and all of the other bounding boxes 1202. In some embodiments that include text, also include active hot links 1204 for some of the textual terms. FIG. 12B shows an example where "Active Drink" and "United States" are displayed as hot links 1204. The search results corresponding to these terms are the results received from the term query server system 118, whereas the results corresponding to the bounding boxes are results from the query by image search systems.

FIG. 13 illustrates a client system 102 with a screen shot of an interactive results document 1200 that is coded by type of recognized entity in the visual query. The visual query of FIG. 11 contains an image of a person 1106, an image of a trademark 1108, an image of a product 1110, and a variety of textual elements 1112. As such the interactive results document 1200 displayed in FIG. 13 includes bounding boxes 1202 around a person 1306, a trademark 1308, a product 1310, and the two textual areas 1312. The bounding boxes of FIG. 13 are each presented with separate cross-hatching which represents differently colored transparent bounding boxes 1202. In some embodiments, the visual identifiers of the bounding boxes (and/or labels or other visual identifiers in the interactive results document 1200) are formatted for presentation in visually distinctive manners such as overlay color, overlay pattern, label background color, label background pattern, label font color, and bounding box border color. The type coding for particular recognized entities is shown with respect to bounding boxes in FIG. 13, but coding by type can also be applied to visual identifiers that are labels.

FIG. 14 illustrates a client device 102 with a screen shot of an interactive results document 1200 with labels 1402 being the visual identifiers of respective sub-portions of the visual query 1102 of FIG. 11. The label visual identifiers 1402 each include a user selectable link to a subset of corresponding search results. In some embodiments, the selectable link is identified by descriptive text displayed within the area of the label 1402. Some embodiments include a plurality of links within one label 1402. For example, in FIG. 14, the label hovering over the image of a woman drinking includes a link to facial recognition results for the woman and a link to image recognition results for that particular picture (e.g., images of other products or advertisements using the same picture.)

In FIG. 14, the labels 1402 are displayed as partially transparent areas with text that are located over their respective sub-portions of the interactive results document. In other embodiments, a respective label is positioned near but not located over its respective sub-portion of the interactive results document. In some embodiments, the labels are coded by type in the same manner as discussed with reference to FIG. 13. In some embodiments, the user activates the display of the search results corresponding to a particular sub-portion corresponding to a label 1402 by tapping on the activation region inside the space outlined by the edges or periphery of the label 1402. The same previewing and selection functions discussed above with reference to the bounding boxes of FIGS. 12A and 12B also apply to the visual identifiers that are labels 1402.

FIG. 15 illustrates a screen shot of an interactive results document 1200 and the original visual query 1102 displayed concurrently with a results list 1500. In some embodiments, text identified in a sub-portion of the visual query corresponding to a respective label 1402 or bounding box 1202, or an identifier of a product, person or other object in the sub-region of the visual query corresponding to a respective label 1402 or bounding box 1202 (e.g., text or an identifier produced by one or more of the search systems 112-A, 112-B and 112-C, FIG. 1) is used by visual query server system 106 (e.g., by a search engine system within, or called by, front end server 110) to identify and provide at least some of the results in results list 1500, and thereby provide additional information likely to be of interest to the user.

In some embodiments, the interactive results document 1200 is displayed by itself as shown in FIGS. 12-14. In other embodiments, the interactive results document 1200 is displayed concurrently with the original visual query as shown in FIG. 15. In some embodiments, the list of visual query results 1500 is concurrently displayed along with the original visual query 1102 and/or the interactive results document 1200. The type of client system and the amount of room on the display 706 may determine whether the list of results 1500 is displayed concurrently with the interactive results document 1200. In some embodiments, the client system 102 receives (in response to a visual query submitted to the visual query server system) both the list of results 1500 and the interactive results document 1200, but only displays the list of results 1500 when the user scrolls below the interactive results document 1200. In some of these embodiments, the client system 102 displays the results corresponding to a user selected visual identifier 1202/1402 without needing to query the server again because the list of results 1500 is received by the client system 102 in response to the visual query and then stored locally at the client system 102.

In some embodiments, the list of results 1500 is organized into categories 1502. Each category contains at least one result 1503. In some embodiments, the categories titles are highlighted to distinguish them from the results 1503. The categories 1502 are ordered according to their calculated category weight. In some embodiments, the category weight is a combination of the weights of the highest N results in that category. As such, the category that has likely produced more relevant results is displayed first. In embodiments where more than one category 1502 is returned for the same recognized entity (such as the facial image recognition match and the image match shown in FIG. 15) the category displayed first has a higher category weight.

As explained with respect to FIG. 3, in some embodiments, when a selectable link in the interactive results document 1200 is selected by a user of the client system 102, the cursor will automatically move to the appropriate category 1502 or to the first result 1503 in that category. Alternatively, when a selectable link in the interactive results document is selected by a user of the client system 102, the list of results 1500 is re-ordered such that the category or categories relevant to the selected link are displayed first. This is accomplished, for example, by either coding the selectable links with information identifying the corresponding search results, or by coding the search results to indicate the corresponding selectable links or to indicate the corresponding result categories.

In some embodiments, the categories of the search results correspond to the query-by-image search system that produces those search results. For example, in FIG. 15 some of the categories are product match 1506, logo match 1508, facial recognition match 1510, image match 1512. The original visual query 1102 and/or an interactive results document 1200 may be similarly displayed with a category title such as the query 1504. Similarly, results from any term search performed by the term query server may also be displayed as a separate category, such as web results 1514. In other embodiments, more than one entity in a visual query will produce results from the same query-by-image search system. For example, the visual query could include two different faces that would return separate results from the facial recognition search system. As such, in some embodiments, the categories 1502 are divided by recognized entity rather than by search system. In some embodiments, an image of the recognized entity is displayed in the recognized entity category header 1502 such that the results for that recognized entity are distinguishable from the results for another recognized entity, even though both results are produced by the same query by image search system. For example, in FIG. 15, the product match category 1506 includes two entity product entities and as such as two entity categories 1502—a boxed product 1516 and a bottled product 1518, each of which have a plurality of corresponding search results 1503. In some embodiments, the categories may be divided by recognized entities and type of query-by-image system. For example, in FIG. 15, there are two separate entities that returned relevant results under the product match category product.

In some embodiments, the results 1503 include thumbnail images. For example, as shown for the facial recognition match results in FIG. 15, small versions (also called thumbnail images) of the pictures of the facial matches for "Actress X" and "Social Network Friend Y" are displayed along with some textual description such as the name of the person in the image.

Figure 16:
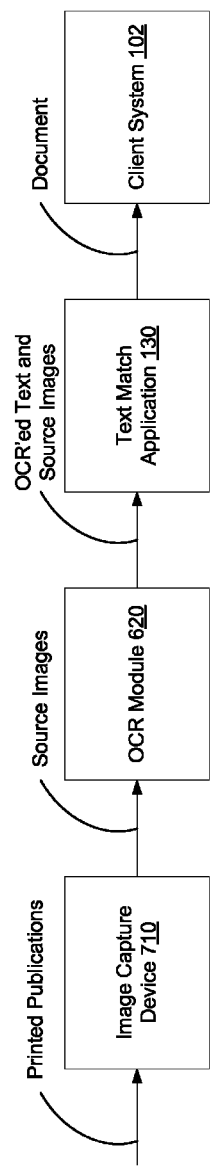
FIG. 16 is a block diagram of a computing environment for applying optical character recognition to a document, according to some embodiments.

FIG. 16 is a block diagram that illustrates a computing environment 1600 for converting printed publications into OCR'ed text. As shown, the computing environment 1600 includes an image capture device such as a scanner or other image capture device (710, FIG. 5), an OCR module (620, FIG. 8), a text match application (632, FIG. 8), and a client system (102, FIG. 5). Only one of each entity is illustrated in this Figure in order to simplify and clarify the present description. As shown in FIGS. 5 (client system) and 8 (OCR search system), there can be other entities in the computing environment 1600 as well. In some embodiment, the OCR module 620 and the text match application 632 are combined into a single entity.

Optionally, the image capture device 710 is a scanner or other hardware device configured to optically scan printed publications (e.g., books, newspapers) and convert the printed publications to digital text images. Alternately, the image capture device 710 is the camera or image capture device discussed with relation to FIG. 5. The output of the scanner 710 is provided to the OCR module 620.

The OCR module 620 is a hardware device and/or software program configured to convert (or translate) source images (e.g., visual queries) into editable text (hereinafter called OCR'ed text). The OCR module 620 processes the source images using computer algorithms and generates corresponding OCR'ed text.

In addition, the OCR module 620 generates and outputs positional information for image segments containing the OCR'ed text in the source images. For example, for each segment of text (e.g., paragraph, column, title), the OCR module 620 provides a set of values describing a bounding box that uniquely specifies the segment of the source image containing the text segment. In one example, the values describing the bounding box include two-dimensional coordinates of the top-left corner of a rectangle on an x-axis and a y-axis, and a width and a height of the rectangle. Therefore, the bounding box uniquely identifies a region of the source image as the image segment corresponding to the text segment. In other embodiments the bounding box can specify image segments using shapes other than a rectangle.

Optionally, the OCR module 620 generates a confidence level that measures a quality or quality level of the OCR'ed text in an image segment. In addition, the OCR module 620 optionally generates other information such as format information (e.g., one or more of: font, font size, font category (e.g., serif vs. sans serif), style) and structural information for the OCR'ed text in an image segment. The structural information includes information on layout, sizing, and/or positioning, etc. of the textual characters in the visual query. In some embodiments, the structural information includes one or more of: relative sizes of the characters in the visual query with respect to each other, relative positions of the characters with respect to each other and to one or more reference points in the source image (e.g., non-text objects, the margins, the page edges, line breaks, etc., in the received visual query), word count, word order, and line spacing. In some embodiments, the structural information includes the format information described above. The output of the OCR module 620 is provided to the text match application 632.

In some embodiments, the OCR module 620 is implemented using well know OCR methodologies. Examples of the OCR module 620 include ABBYY FineReader OCR, ADOBE Acrobat Capture, and MICROSOFT Office Document Imaging. Optionally, the OCR module includes modules, programs or instructions for implementing OCR methodologies disclosed in patent application Ser. No. 12/366, 329, "Methods and Systems for Assessing the Quality of Automatically Generated Text," filed Feb. 5, 2009, and patent application Ser. No. 12/366,547, "Selective Display of OCR'ed Text and Corresponding Images from Publications on a Client Device," filed Feb. 5, 2009, both of which are hereby incorporated by reference in their entireties.

The text match application 632 is configured to provide electronic representations of printed publications to users. The text match application 632 stores information received from the OCR module 620 including the OCR'ed text, the source images, the positional information relating segments of the OCR'ed text to segments of the source images, and the confidence levels. In one embodiment, the text match application 632 uses the received information to calculate a "quality score" for each text segment of the OCR'ed text; the quality score measures the overall quality of the text segment.

The client system 102 is a computer system or device (e.g., a cell phone, personal digital assistant other handheld device controlled by one or more microprocessors) configured to request documents from the text match application 632 and display the documents received in response.

The image capture device 710 (e.g., in the client system) is communicatively connected to the OCR module 620; the OCR module 620 is communicatively connected to the text match application 632; and the text match application 632 is communicatively connected to the client system 102. Any of the connections may be through one or more a wired or wireless networks. Examples of such networks include the Internet, an intranet, a WiFi network, a WiMAX network, a mobile telephone network, or a combination thereof.

Figure 17:
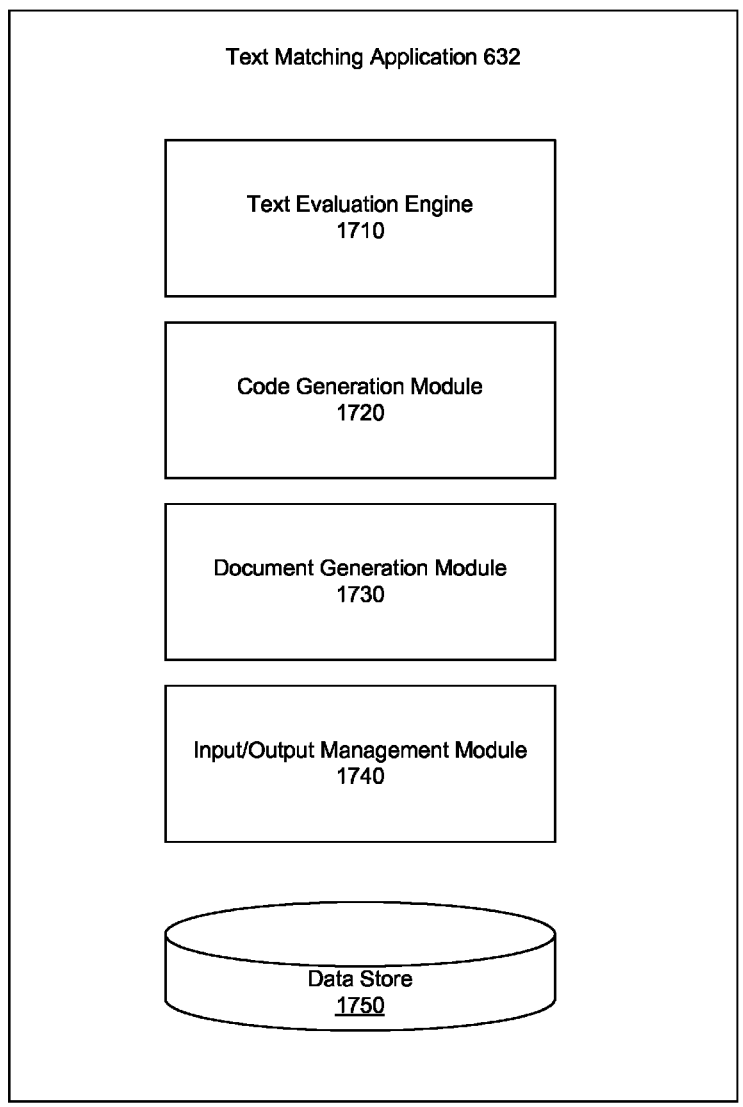
FIG. 17 is a block diagram of modules within the text match application of an OCR search system, according to some embodiments.

FIG. 17 is a block diagram of modules within the text match application 632 (e.g., of the OCR search system in FIG. 8), according to some embodiments. Some embodiments of the text match application 632 have different and/or other modules than the ones described herein. Similarly, in other embodiments the functions of the text match application can be distributed among the modules in a different manner than is described here. As illustrated, the text match application 632 includes a text evaluation engine 1710, a code generation module 1720, a document generation module 1730, an Input/Output management module (hereinafter called the I/O module) 1740, and a data store 1750. The text match application 632 evaluates and stores canonical source documents as well as the documents received as visual queries. As such, the text match application 632 can output image portions of a canonical source document or OCR'ed text portions of the canonical source document associated with high quality textual strings extracted from the visual query.

A canonical source document is a document from an established source, such as a book publisher, web host, or other document database that is known to store canonical documents. Many canonical source documents are original works of authorship obtained from a source associated with the author(s) of the documents. For example, in many cases, a canonical source document is a document (i.e., with the content of the document) published by the author or an entity associated with or authorized by the author to publish the document. Other documents having the same or similar content as a canonical document, but not published by an established source or not published by the author or an entity associated with or authorized by the author to publish the document, are not canonical source documents. Typically, canonical source documents include text that is stored as text, as opposed to text that is represented solely by an image that requires optical analysis in order to recover the text. Thus, the text in canonical source documents authoritatively represents the text content of the canonical source document. Typically canonical source documents are stored in one of a number of predefined formats (e.g., XML, HTML, RTL, etc.) that facilitate indexing the content of those documents, and comparison of the text in these documents with candidate strings (and/or the comparison of image portions or image characteristics in the documents with one or more image portions of a visual query).

The text evaluation engine 1710 generates quality scores for text segments based on information provided by the OCR module 620. The quality score is a numeric value that measures an overall quality of the text segment. In one embodiment, the quality score ranges between 0 and 100, with 0 indicating high text quality and 100 indicating low text quality.

To generate the quality score, an embodiment of the text evaluation engine 1710 generates a set of language-conditional character probabilities for each character in a text segment. Each language-conditional character probability indicates how consistent the character and a set of characters that precede the character in the text segment are with a particular language model (e.g., in some embodiments, the character probability is a metric of conformance to the language model that takes into account the set of characters, if any, that precede the character in the text segment). The set of characters that precede the character is typically limited to a small number (e.g. 4-8 characters) such that characters in compound words and other joint words are given strong probability values based on the model. Optionally, the language-conditional character probabilities are combined with other indicators of text quality (e.g., the confidence levels provided by the OCR module 620) to generate a text quality score for each character in the text segment. The calculation of such a value allows for location-specific analysis of text quality.

The text evaluation engine 1710 combines the set of text quality scores associated with the characters in a text segment to generate a quality score that characterizes the quality of the text segment. In one example, the text evaluation engine 1710 averages the text quality scores associated with the characters in the text segment to generate the quality score. Alternatively, the text evaluation engine combines the text quality scores associated with the characters in the text segment in a way that gives greater weight to some scores (e.g., scores associated with low quality) or portions of the text segment than other scores (e.g., scores associated with high quality) or portions of the text segment.

Code generation module 1720 obtains or generates the canonical source document for display on the client system 102. The canonical source document to be displayed may be either an image version of the document or a text version of the canonical source document.

Document generation module 1730 generates results documents that include portions of canonical source documents and provides them to the requesting client system 102. In one embodiment, the generated results documents are web pages formed using the Hypertext Markup Language (HTML). Other embodiments generate results documents that are not web pages, such as documents in the Portable Document Format (PDF) or XML documents.

To generate a results document for presentation, document generation module 1730 identifies the canonical source document (e.g., a publication) and portion being requested by a client system 102 based on high quality textual character strings extracted from the visual query and scored as discussed above. The canonical source documents are retrieved from the data store 1750. In some embodiments, the document generation module 1730 retrieves the image segment from the canonical source document (e.g., a source image of the canonical source document) that includes the high quality textual character string from the visual query. In other embodiments, the document generation module 1730 retrieves text segments (sometimes herein called canonical text) from the identified canonical source document, which includes the high quality textual character string from the visual query. Alternatively, it may retrieve both.

In some embodiments, the document generation module 1730 generates the results document when the OCR'ed text becomes available. Alternatively, the document generation module 1730 dynamically generates the results document on demand (e.g., upon request from the client system 102). In the latter case, the search results for the visual query include a link for obtaining the canonical source document from the OCR search system 112-B or from another server.

In some embodiments, the document generation module 1730 combines a visual query with one or more pertinent portions of a corresponding canonical source document to generate a result that appears to be a cleaned-up or repaired version of the visual query. For example, the document generation module 1730 may superimpose a textual portion of a canonical source document over a portion of a corresponding visual query that includes text corresponding to the textual portion of the canonical source document. In some embodiments, when generating the combination, the canonical source document portion is oriented to match the orientation of the visual query. For example, if the visual query is oriented so that the text is displayed at a 45-degree angle, the corresponding canonical source document portion is oriented in substantially the same way when combined with the visual query.

The I/O module 1740 manages inputs and outputs of the text match application 632. For example, the I/O module 1740 stores data received from the OCR module 620 in the data store 1750 and activates the text evaluation engine 1710 to generate corresponding quality scores. As another example, the I/O module 1740 receives requests from the client system 102 and activates the document generation module 1730 to provide the requested documents in response. If I/O module 1740 receives a request for an image segment, the I/O module 1740 retrieves the image segment from the data store 1750 and provides it to the client system 102. In one embodiment, the I/O module 1740 processes the image segment before returning it to the client system 102. For example, the I/O module 1740 may adjust a size and/or a resolution of the image segment based on a resolution of the client system's display device for displaying the document.

The data store 1750 stores data used by the text match application 632. Examples of such data include the OCR'ed text and associated information (e.g., quality scores, positional information), source images, and generated documents. The data store 1750 may store the aforementioned data (e.g., OCR'ed text and associated information) in a relational database or any other type of database.

Figure 18:
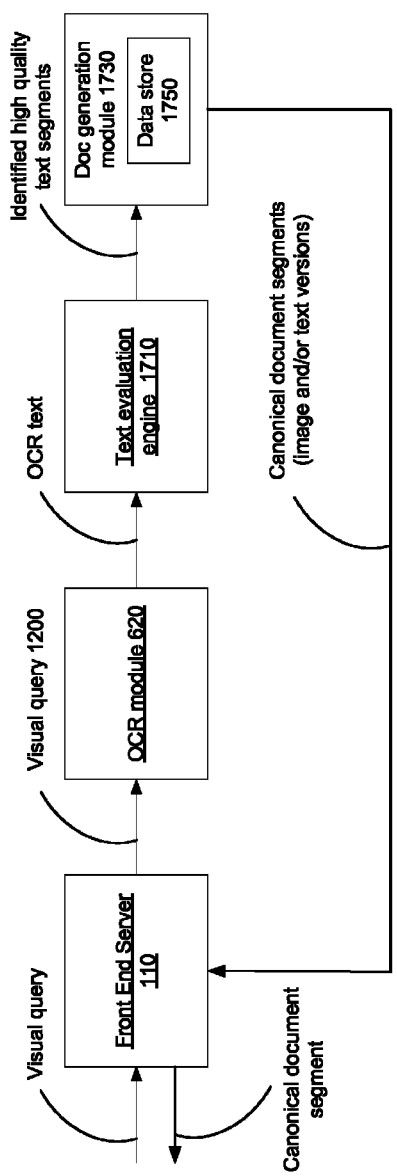
FIG. 18 is a flow chart of a process for retrieving a canonical document in response to a visual query, according to some embodiments.

FIG. 18 is a flow chart of a process for retrieving a canonical source document (or a relevant portion of a canonical source document) in response to a visual query, according to some embodiments. A visual query (1200, FIG. 12) is provided to the front end server (110, FIG. 6). The front end server 110 sends the visual query to a plurality of search systems, one of which is the OCR search system (112-B, FIG. 8). As explained above, the OCR module 620, of the OCR search system 112-B, converts the visual query image into editable text (OCR'ed text). The OCR module 620 also generates and outputs positional information describing the image segments containing the OCR'ed text in the source images. The OCR'ed text is then scored by the text evaluation engine 1710. The text evaluation engine 1710 generates a quality score for each character that is partially based on the quality scores of its neighboring characters. The text evaluation engine 1710 then generates quality scores for text segments. The text segment(s) receiving a high quality score (over a set threshold) are sent to the document generation module 1730. The document generation module retrieves a canonical source document stored in the data store 1750 by finding matches to the high quality text segment(s). The document generation module may return an image version, a text version, or both an image and text version of the canonical source document. In some embodiments, the portion of the canonical source document matching the visual query is selected by the front end server or by the OCR server to be returned to the client system. In other embodiments, the entire canonical source document is returned to the requesting client device.

Figure 19:
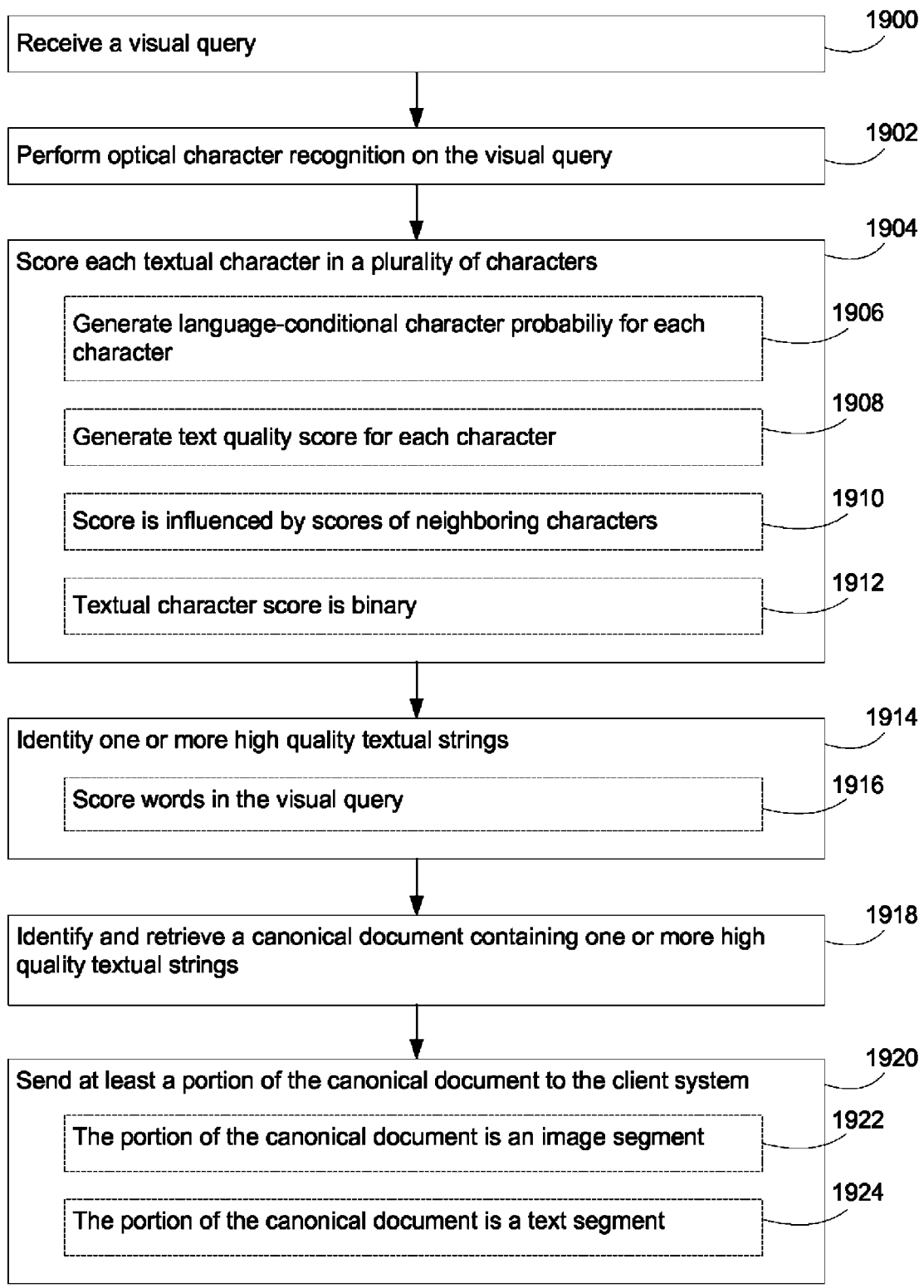
FIG. 19 is a flow chart of a process for identifying high quality textual strings in a visual query, identifying a canonical document corresponding to the identified high quality textual strings, and returning at least a portion of the canonical document containing these strings, according to some embodiments.

FIG. 19 is a flow diagram illustrating the process for identifying high quality textual strings in a visual query and returning at least a portion of a canonical source document containing the textual strings. Each of the operations shown in FIG. 19 typically correspond to instructions stored in a computer memory or non-transitory computer readable storage medium. Specifically, many of the operations correspond to instructions for the OCR search system 112-B whose modules are discussed herein with regard to FIGS. 8, 16, 17, and 18.

As explained with respect to FIG. 2, the front end search system 110 receives a visual query 1200 (FIG. 12) from the client system. The search system sends the visual query to a plurality of search systems, including the OCR search system 112-B. The OCR search system receives the visual query (1900). The OCR module 620 performs optical character recognition on the visual query to produce text recognition data representing textual characters (1902). In some embodiments, the textual characters include a plurality of characters within a contiguous region of the visual query. The text evaluation engine 1710 scores each textual character in the plurality of textual characters (1904). In some embodiments, the text evaluation engine generates a language-conditional character probability for each character (1906). In some implementations, the language-conditional character probability is based on neighboring characters. For example, in some embodiments, the language-conditional character probability indicates how consistent the character and a set of characters that precede the character are with a particular language model (e.g., the language model for a particular language, or the language model for a particular language as spoken or used in a particular geographic region).

In some embodiments, text evaluation engine 1710 then generates a text quality score for each character or symbol (1908). Optionally, the text quality score for an individual character or symbol is calculated for the character alone. Alternatively, the score of each character or symbol is influenced by its neighboring characters (1910). In some embodiments, the scoring is binary (1912). For example, each character is either scored as a high quality textual character or a low quality textual character. In some embodiments, a transition cost is associated with each character, such that the higher the transition cost, the more likely it is that a character will be scored similarly to its neighbors. For example, given a typical non-zero transition cost, if a neighboring character is scored as high quality, the current character is more likely to be scored as high quality as well than if the current character were scored in isolation, without consideration or influence by its neighbors.

The text evaluation engine 1710 also generates scores for text segments. Using the text segment scores, one or more high quality textual strings are identified (1914). Each identified high quality textual string comprises a plurality of high quality textual characters from among the plurality of textual characters in the contiguous region of the visual query. In some embodiments, words in the visual query are scored (producing word scores) in accordance with the textual character scores of the textual characters comprising a respective word (1916). Then one or more high quality textual strings, each comprising a plurality of high quality textual words, are identified in accordance with the word scores (1914).

The document generation module 1730 identifies and retrieves a canonical source document containing the one or more identified high quality textual strings (1918). The canonical source document is retrieved from the data store 1750. Then at least a portion of the canonical source document is sent to the client system (1920).

In some embodiments, the portion of the canonical source document that is returned is an image segment (1922). In other embodiments, the portion of the canonical source document that is returned is a machine readable text segment (1924). The term "machine readable text" means encoded text, such as Unicode or ASCII encoded text, that is machine readable without having to first convert an image into encoded text characters or symbols. In some embodiments the type of canonical source document returned depends on the quality score(s) of the one or more high quality textual strings. In some embodiments, when there are more than one identified high quality textual strings, the scores are combined to produce a single quality score. For example, in one implementation, the combined quality score is the highest (i.e., best) score of the identified high quality textual strings. In another implementation, the combined quality score is an average score of the identified high quality strings. In yet another implementation, the combined quality score is an average score of the identified high quality strings after removing any outliers (e.g., strings whose scores are differ by more than two sigma from an average or median score of the identified high quality strings). In some embodiments, an image version of the canonical source document is returned when the quality score is below a predetermined value, and a text version of the canonical source document is returned when the quality score is above the predetermined value.

In some embodiments, the original query is returned to the client system along with both a canonical source document image segment and a canonical source document text segment. As such, all three are provided for simultaneous presentation to the user. In this way the viewer can determine which version he prefers. For example, a user may wish to just read an article written in the New York Times, or he may wish to see the article as it appeared on the page of the newspaper as published, including any pictures, graphs, and advertisements on that newspaper page.

Figure 20:
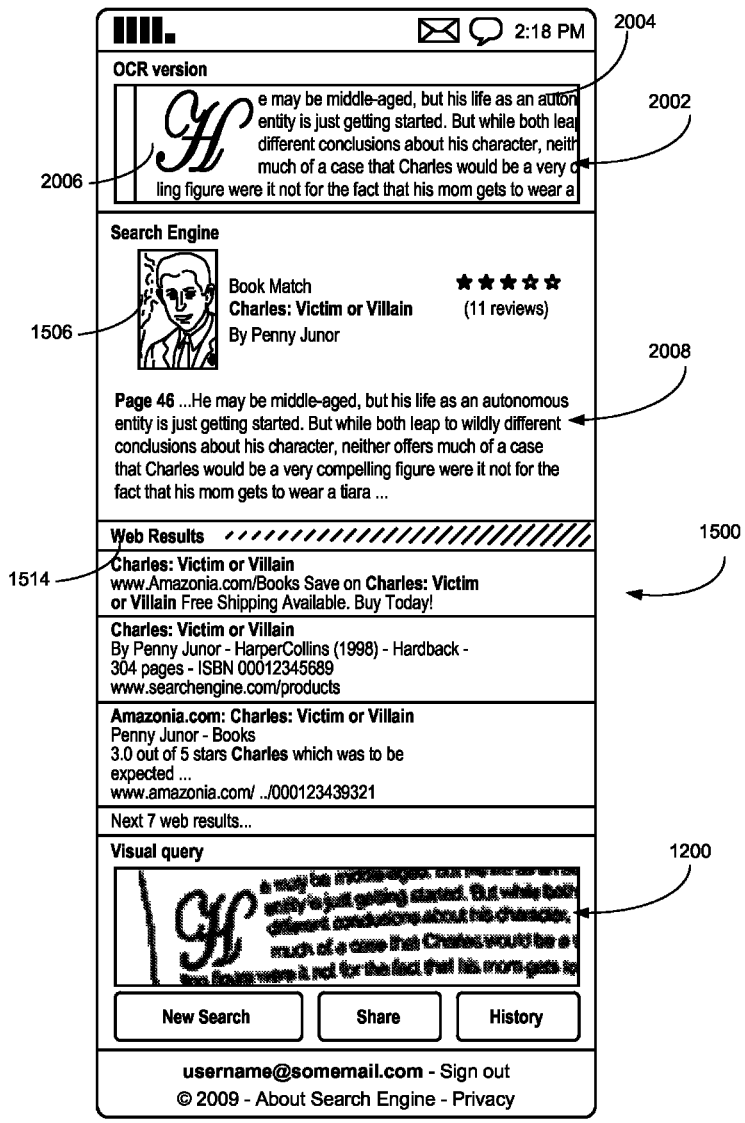
FIG. 20 illustrates a client system user interface in which a results list and canonical document portions returned in response to a visual query are displayed, according to some embodiments.

FIG. 20 illustrates a client system display of an embodiment of a results list 1500 and canonical source document portions returned for a visual query 1200 which was a portion of a page in a book. The visual query 1200 in this embodiment is a photograph of a portion of a book called "Charles: Victim or Villain." The visual query 1200 is of low quality. In fact, it is almost impossible to read because it is out of focus and the page is warped. The search system identified this query using an OCR search system 112-B (FIG. 8) that converted the visual query image into OCR'ed text and found high quality text strings which were then used to retrieve a matching canonical source document as explained with reference to FIG. 19. In this embodiment, a portion of the canonical source document matching the visual query is provided in two formats. An image segment 2002 of the canonical source document is provided. The image segment matches both text 2004 and visual (or non-text) elements 2006. A machine readable text segment of the canonical source document is provided as well 2008. In some embodiments, the client system or device 102 includes copy and paste instructions for copying text from the machine readable text segment 2008 and pasting the copied text into other documents or applications on the client device, in much the same way as text in other documents can be copied and pasted.

In addition to providing the canonical source document in two formats, the canonical source document information is used in some embodiments to search other visual query search systems and provide the additional relevant results shown in the results list 1500. In this embodiment, the additional search results include a product match for the book 1506, a review of the book, and several web results 1514. Text from the canonical source document is used by visual query server system 106 (e.g., by a search engine system within, or called by, front end server 110) to identify and provide these additional search results, and thereby provide additional information likely to be of interest to the user. For example, once a canonical source document matching the OCR'ed text is identified, the title of the document and/or other information extracted from the document and/or citation information identifying the document is provided in the form of a textual query to a search engine system (e.g., search system 112-N, FIG. 1), to obtain the web results 1514.

Figure 21A:
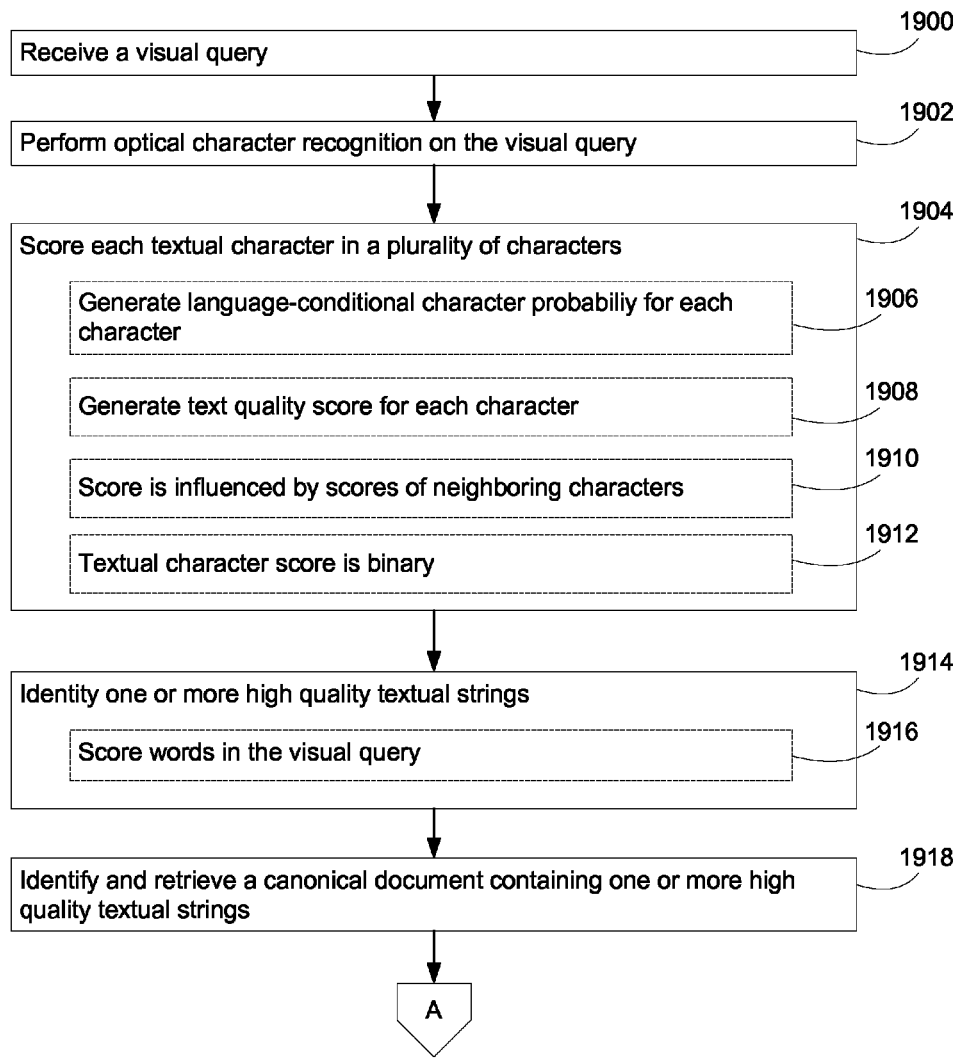
FIGS. 21A-21B are flow charts of a process for identifying high quality textual strings in a visual query, identifying a canonical document corresponding to the identified high quality textual strings, and generating a combination of at least a portion of the canonical document with the visual query, according to some embodiments.
Figure 21B:
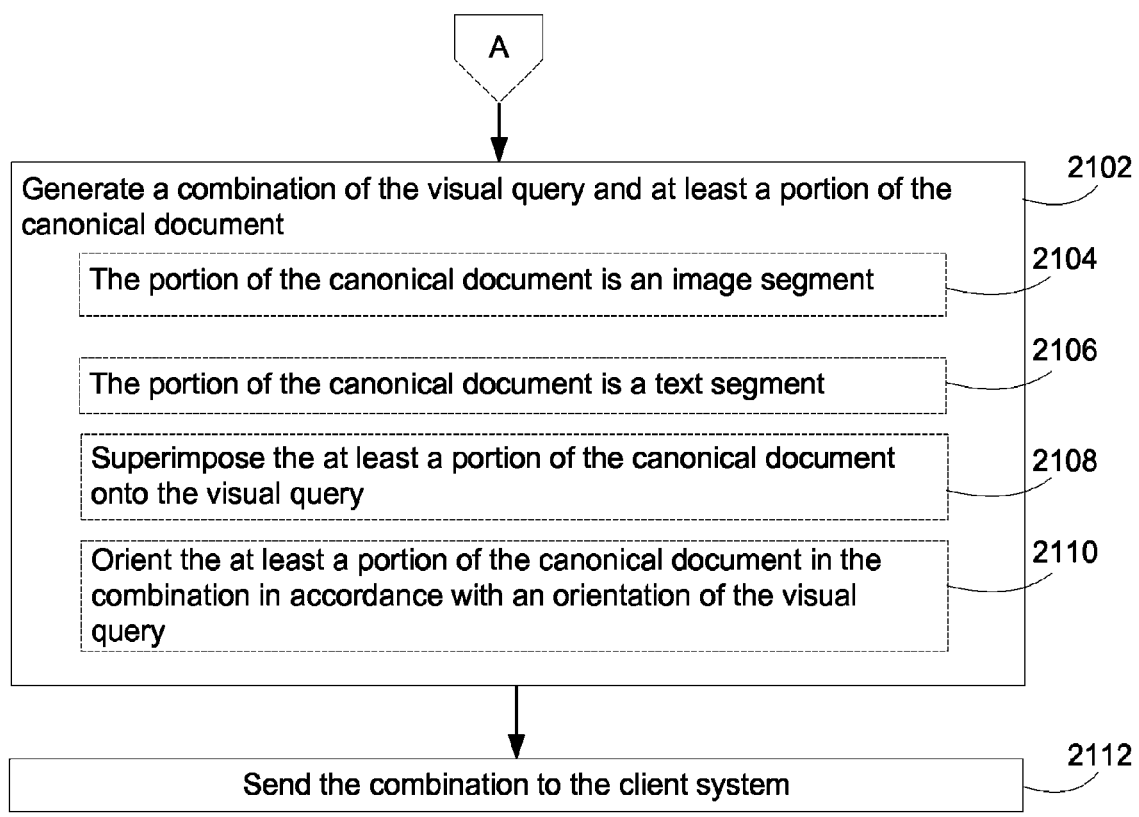

FIGS. 21A-21B are flow diagrams illustrating a process for identifying high quality textual strings in a visual query, identifying a canonical source document corresponding to the identified high quality textual strings, and generating a combination of at least a portion of the canonical source document with the visual query, according to some embodiments. Each of the operations shown in FIGS. 21A-21B corresponds to instructions stored in a computer memory or non-transitory computer readable storage medium. Specifically, many of the operations correspond to instructions for the OCR search system 112-B whose modules are discussed herein with regard to FIGS. 8, 16, 17, and 18.

Some of the operations shown in FIGS. 21A-21B correspond to certain operations described above with reference to FIG. 19 (e.g., operations 1900, 1902, through 1918).

As explained with respect to FIG. 2, the front end search system 110 receives a visual query 1200 (FIG. 12) from the client system. The search system sends the visual query to a plurality of search systems, including the OCR search system 112-B. The OCR search system receives the visual query (1900). The OCR module 620 performs optical character recognition on the visual query to produce text recognition data representing textual characters (1902). In some embodiments, the textual characters include a plurality of characters within a contiguous region of the visual query. The text evaluation engine 1710 scores each textual character in the plurality of textual characters (1904). In some embodiments, the text evaluation engine generates a language-conditional character probability for each character (1906). In some implementations, the language-conditional character probability is based on neighboring characters. For example, in some embodiments, the language-conditional character probability indicates how consistent the character and a set of characters that precede the character are with a particular language model.

In some embodiments, text evaluation engine 1710 then generates a text quality score for each character or symbol (1908). Optionally, the text quality score for an individual character or symbol is calculated for the character alone. Alternatively, the score of each character or symbol is influenced by its neighboring characters (1910). In some embodiments, the scoring is binary (1912). For example, each character is either scored as a high quality textual character or a low quality textual character. In some embodiments, a transition cost is associated with each character, such that the higher the transition cost, the more likely it is that a character will be scored similarly to its neighbors. For example, given a typical non-zero transition cost, if a neighboring character is scored as high quality, the current character is more likely to be scored as high quality as well than if the current character were scored in isolation, without consideration or influence by its neighbors.

The text evaluation engine 1710 also generates scores for text segments. Using the text segment scores, one or more high quality textual strings are identified (1914). Each identified high quality textual string comprises a plurality of high quality textual characters from among the plurality of textual characters in the contiguous region of the visual query. In some embodiments, words in the visual query are scored (producing word scores) in accordance with the textual character scores of the textual characters comprising a respective word (1916). Then one or more high quality textual strings, each comprising a plurality of high quality textual words, are identified in accordance with the word scores (1914).

The document generation module 1730 identifies and retrieves a canonical source document containing one or more high quality textual strings (1918). The identified canonical source document is retrieved from the data store 1750.

A combination of the visual query and at least a portion of the identified canonical source document is generated (2102). In some implementations, document generation module 1730 combines the visual query with pertinent portions of the canonical source document to generate a result that gives an appearance of a cleaned-up or repaired version of the visual query. In some embodiments, the combination is generated by superimposing the portion of the canonical source document onto the visual query (2108). In one example, a text portion of the canonical source document is superimposed onto a portion of the visual query that includes the text portion of the canonical source document.

In some embodiments, the portion of the canonical source document that is combined with the visual query is an image segment (2104). In some embodiments, the image segment matches both text and visual (or non-text) elements of the visual query. In some other embodiments, the portion of the canonical source document that is combined with the visual query is a machine readable text segment (2106). The term "machine readable text" means encoded text, such as Unicode or ASCII encoded text, that is machine readable without having to first convert an image into encoded text characters or symbols. In some embodiments the type of canonical source document used for the combination depends on the quality score of the high quality textual string. As explained in more detail above with reference to FIG. 19, in some embodiments, when there are more than one identified high quality textual strings, the scores are combined to produce a single score. In some embodiments, an image version of the canonical source document is returned when the quality score is below a predetermined value, and a text version of the canonical source document is returned when the quality score is above the predetermined value.

In some embodiments, the portion of the canonical source document is oriented in the combination in accordance with an orientation of the visual query (2110). The canonical source document portion, when combined with the visual query, is oriented to substantially match the orientation of the visual query. For example, if the visual query is oriented at a 45-degree angle, so that the text is oriented at the same angle, the canonical source document portion is oriented to match the orientation of the visual query.

The combination is sent to the client system (2112) for display as an OCR result for the visual query. In some embodiments, the original visual query is returned to the client system along with the combination of the visual query and the canonical source document portion. As such, both are provided for simultaneous presentation to the user.

Figure 22:
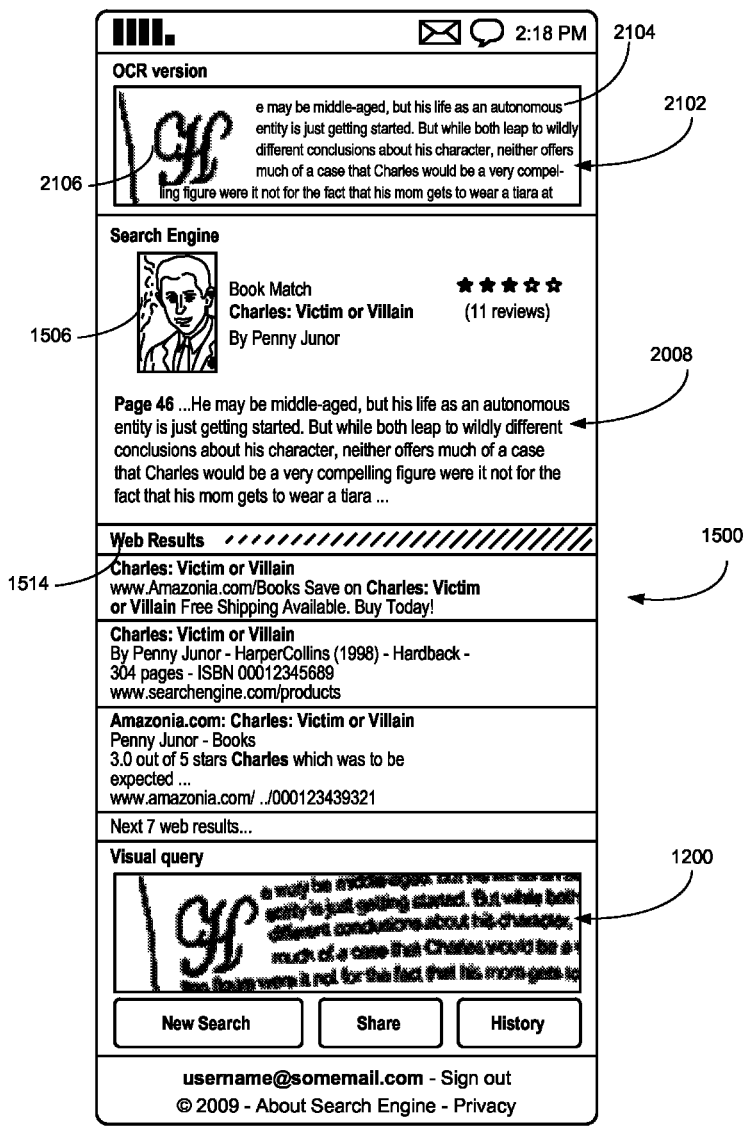
FIG. 22 illustrates a client system user interface in which a results list and a combination of a canonical document portion and a visual query, returned in response to the visual query, are displayed, according to some embodiments.

FIG. 22 illustrates a client system display of an embodiment of a results list 1500 (described above with respect to FIGS. 15 and 20) and a combination 2102 of a visual query 1200 and a canonical source document portion returned for the visual query 1200. In this example, the canonical source document portion is a portion of a page in a book. The visual query 1200 in this embodiment is a photograph of a portion of a book called "Charles: Victim or Villain." The visual query 1200 is of low quality; the visual query 1200 is out of focus and the page captured in the visual query 1200 is warped. The search system identified this query using an OCR search system 112-B (FIG. 8) that converted the visual query image into OCR'ed text and found high quality text strings which were then used to identify and retrieve a matching canonical source document as explained with reference to FIGS. 19 and 21A-21B. In this embodiment, a combination 2102 of the visual query 1200 and a portion of the canonical source document is provided. A canonical source document portion 2104 is superimposed onto the visual query 1200, with the resulting combination 2102 having a portion 2106 of the visual query still visible and the canonical source document portion 2104. In some implementations, the canonical source document portion 2104 is an image segment of the canonical source document or a machine readable text segment of the canonical source document, for example text segment 2008. In some embodiments, the client system or device 102 includes copy and paste instructions for copying text from the machine readable text segment 2008 and pasting the copied text into other documents or applications on the client device, in much the same way as text in other documents can be copied and pasted.

In addition to providing the combination of the visual query and the canonical source document portion, the canonical source document information is used in some embodiments to search other visual query search systems and provide additional search results, relevant to the visual query, as shown in results list 1500. In this embodiment, the additional search results include a product match for the book 1506, a review of the book, and several web results 1514. As described above with reference to FIG. 15, in some embodiments text from the canonical source document is used by the visual query server system 106 to identify and provide these additional search results, and thereby provide additional information likely to be of interest to the user.

Figure 23:
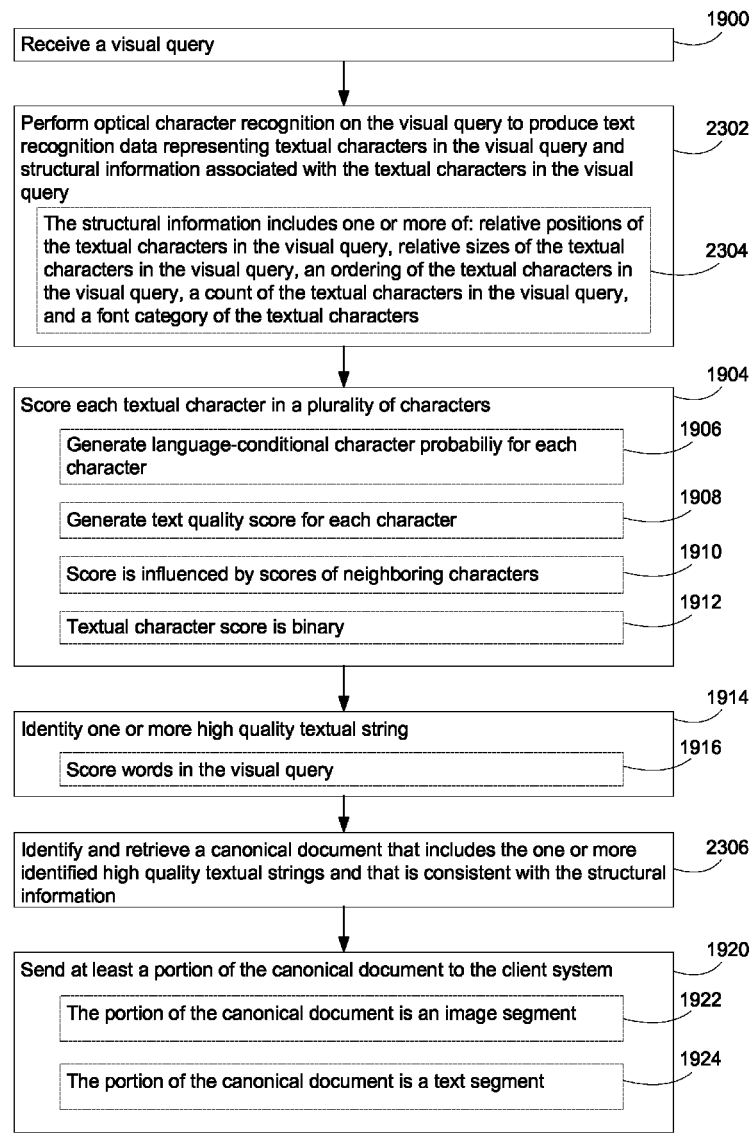
FIG. 23 is a flow diagram illustrating a process for identifying high quality textual strings and structural information associated with the textual strings in a visual query, identifying a canonical document corresponding to the identified high quality textual strings at locations within the canonical document consistent with the structural information, and generating a combination of at least a portion of the canonical document with the visual query, according to some embodiments.

FIG. 23 is a flow diagram illustrating a process for identifying high quality textual strings and structural information associated with the textual strings in a visual query, identifying a canonical source document corresponding to the identified high quality textual strings at locations within the canonical source document consistent with the structural information, and generating a combination of at least a portion of the canonical source document with the visual query, according to some embodiments. Each of the operations shown in FIG. 23 correspond to instructions stored in a computer memory or computer readable storage medium. Specifically, many of the operations correspond to instructions for the OCR search system 112-B whose modules are discussed herein with regard to FIGS. 8, 16, 17, and 18.

Some of the operations shown in FIG. 23 correspond to certain operations described above with reference to FIG. 19 (e.g., operations 1900, 1904-1916 and 1920-1924, etc.).

As explained with respect to FIG. 2, the front end search system 110 receives a visual query 1200 (FIG. 12) from the client system. The search system sends the visual query to a plurality of search systems, including the OCR search system 112-B. The OCR search system receives the visual query (1900). The OCR module 620 performs optical character recognition on the visual query to produce text recognition data representing textual characters and structural information associated with the textual characters (2302). In some embodiments, the textual characters include a plurality of characters within a contiguous region of the visual query. In some embodiments, structural information includes one or more of: relative positions of the textual characters in the visual query, relative sizes of the textual characters in the visual query, an ordering of the textual characters in the visual query, a count of the textual characters in the visual query, and a font category of the textual characters (2304). Relative positions of the characters include positions of the characters relative to each other and positions of the characters relative to reference point elements in the visual query (e.g., margins, page edges, non-text objects, line breaks, etc.). In some implementations, ordering of the textual characters include word order. In some implementations, a count of the textual characters includes a word count per line.

The text evaluation engine 1710 scores each textual character in the plurality of textual characters (1904). In some embodiments, the text evaluation engine generates a language-conditional character probability for each character (1906). In some implementations, the language-conditional character probability is based on neighboring characters. For example, in some embodiments, the language-conditional character probability indicates how consistent the character and a set of characters that precede the character are with a particular language model.

In some embodiments, text evaluation engine 1710 then generates a text quality score for each character or symbol (1908). Optionally, the text quality score for an individual character or symbol is calculated for the character alone. Alternatively, the score of each character or symbol is influenced by its neighboring characters (1910). In some embodiments, the scoring is binary (1912). For example, each character is either scored as a high quality textual character or a low quality textual character. In some embodiments, a transition cost is associated with each character, such that the higher the transition cost, the more likely it is that a character will be scored similarly to its neighbors. For example, given a typical non-zero transition cost, if a neighboring character is scored as high quality, the current character is more likely to be scored as high quality as well than if the current character were scored in isolation, without consideration or influence by its neighbors.

The text evaluation engine 1710 also generates scores for text segments. Using the text segment scores, one or more high quality textual strings are identified (1914). Each identified high quality textual string comprises a plurality of high quality textual characters from among the plurality of textual characters in the contiguous region of the visual query. In some embodiments, words in the visual query are scored (producing word scores) in accordance with the textual character scores of the textual characters comprising a respective word (1916). Then one or more high quality textual strings, each comprising a plurality of high quality textual words, are identified in accordance with the word scores (1914).

The document generation module 1730 identifies and retrieves a canonical source document that contains the one or more of identified high quality textual strings and that is consistent with (e.g., contains the identified high quality textual strings at locations within the canonical source document that are consistent with) the structural information (2306). The canonical source document is retrieved from the data store 1750. Then at least a portion of the canonical source document is sent to the client system (1920). Structural aspects in the text may be different across different editions of the same book (e.g., different words as the first word in a line, line breaks at different spots in a sentence, etc.) and thus yield different structural information. When the document generation module 1730 looks for a canonical source document to retrieve, it looks for a canonical source document that includes the identified one or more high quality textual strings in a way that is the most consistent with the structural information identified in the visual query, i.e., the canonical source document whose structural information is a closest match to the structural information of the visual query.

When at least one matching canonical source document exists and is available in data store 1750, the document generation module 1730 identifies a canonical source document (if any) in data store 1750 whose structural information is consistent with the visual query above a predefined threshold and retrieves that canonical source document. If there is no such canonical source document in data store 1750, the document generation module 1730 identifies the canonical source document whose structural information is most consistent with the visual query regardless of the threshold and retrieves that canonical source document. In some other embodiments, if there is no canonical source document in data store 1750 whose structural information is consistent above the threshold, the document generation module 1730 retrieves a canonical source document without regard to structural information.

In some embodiments, the portion of the canonical source document that is returned is an image segment (1922). In other embodiments, the portion of the canonical source document that is returned is a machine readable text segment (1924). The term "machine readable text" means encoded text, such as Unicode or ASCII encoded text, that is machine readable without having to first convert an image into encoded text characters or symbols. In some embodiments the type of canonical source document returned depends on the quality score of the high quality textual string. As explained in more detail above with reference to FIG. 19, in some embodiments, when there are more than one identified high quality textual strings, the scores are combined to produce a single quality score. In some embodiments, an image version of the canonical source document is returned when the quality score is below a predetermined value, and a text version of the canonical source document is returned when the quality score is above the predetermined value.

In some embodiments, the original query is returned to the client system along with both a canonical source document image segment and a canonical source document text segment. As such, all three are provided for simultaneous presentation to the user. In this way the viewer can determine which version he prefers. For example, a user may wish to just read an article written in the New York Times, or he may wish to see the article as it appeared on the page of the newspaper as published, including any pictures, graphs, and advertisements on that newspaper page.

Figure 24:
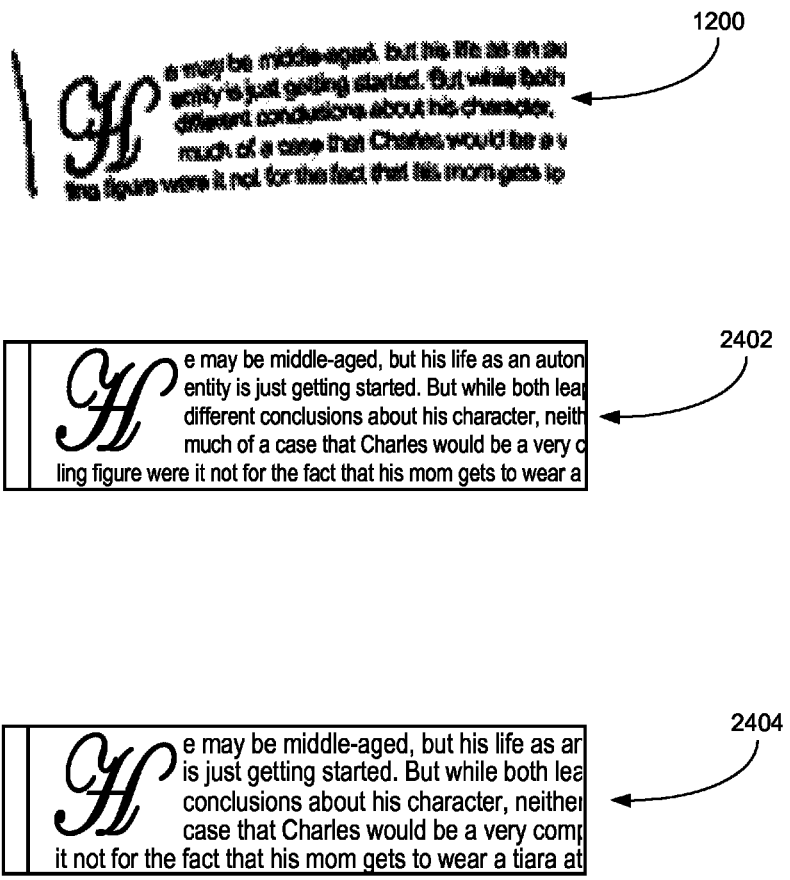
FIG. 24 illustrates canonical document portions with different structural information, according to some embodiments.

FIG. 24 illustrates canonical source document portions with different structural information. FIG. 24 shows the visual query 1200 and two canonical source document portions 2402 and 2404 for the text in the visual query 1200. Canonical source document portions 2402 and 2404 have different structural information. For example, the lines include different sets of words, and the positions of the words relative to each other differ between the two canonical source document portions. In FIG. 24, canonical source document portion 2402 has structural information that is the most consistent with that of the visual query 1200, and thus would be the canonical source document identified by the text matching application 632 (or, more generally, by the visual query server system 106), retrieved from data store 1750 and sent to the client system that submitted the visual query.

Figure 25A:
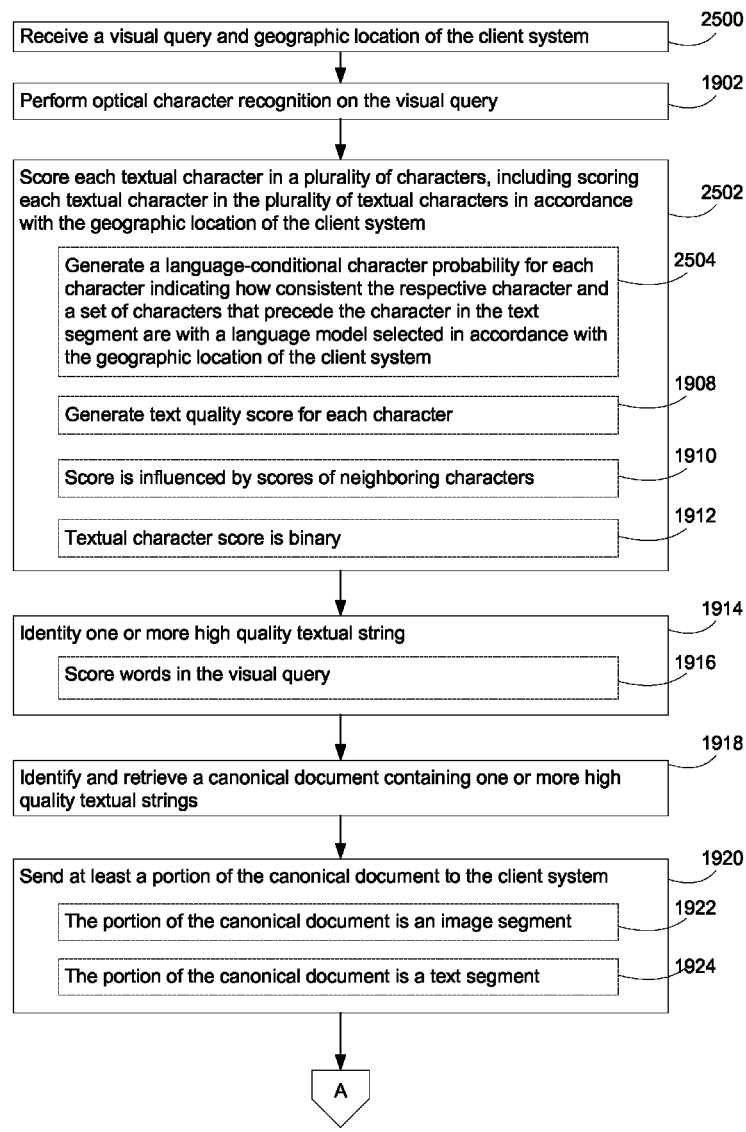
FIGS. 25A-25B are flow diagrams illustrating the process for identifying high quality textual strings in a visual query, including scoring textual characters in the visual query in accordance with a geographic location of a client system, and returning at least a portion of a canonical document containing the textual strings, according to some embodiments.
Figure 25B:
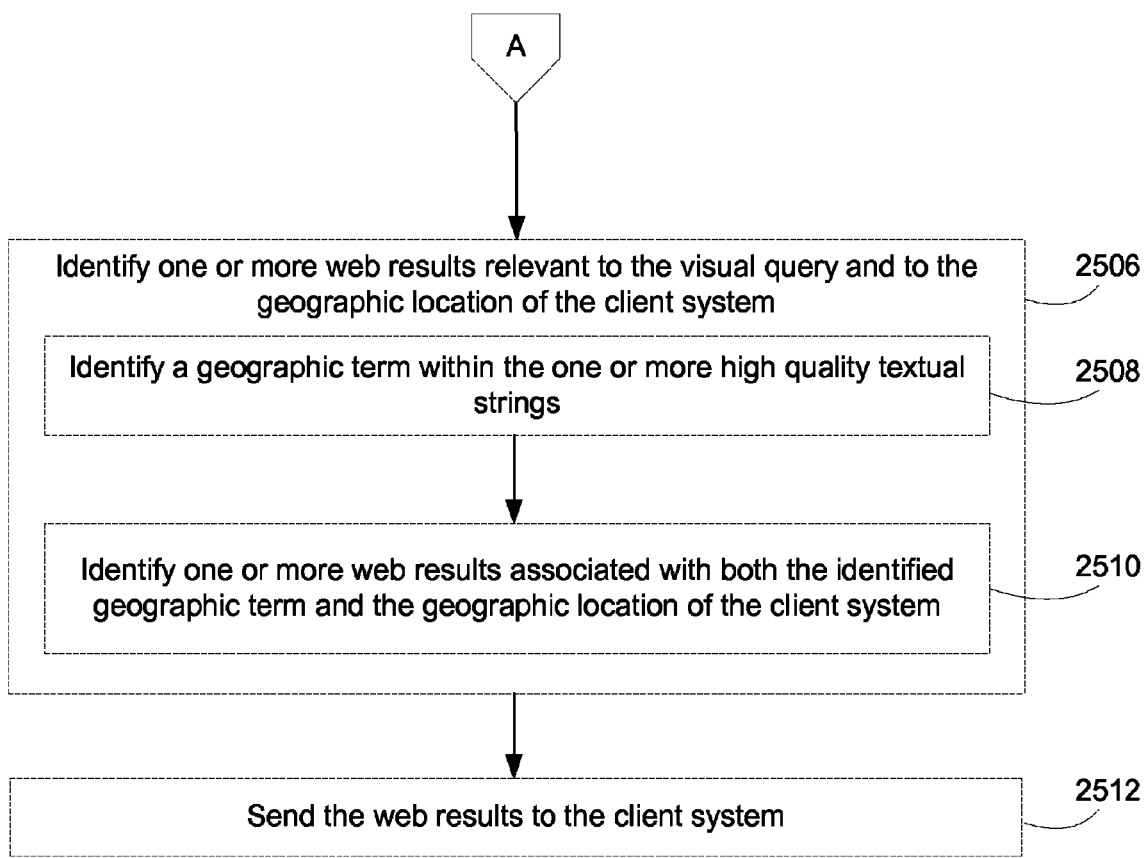

FIGS. 25A-25B are flow diagrams illustrating a process for identifying high quality textual strings in a visual query, including scoring textual characters in the visual query in accordance with a geographic location of a respective client system from which the visual query is received, and returning at least a portion of a canonical source document containing matching textual strings, according to some embodiments. Each of the operations shown in FIGS. 25A-25B correspond to instructions stored in a computer memory or non-transitory computer readable storage medium. Specifically, many of the operations correspond to instructions for the OCR search system 112-B whose modules are discussed herein with regard to FIGS. 8, 16, 17, and 18.

Some of the operations shown in FIGS. 25A-25B correspond to certain operations described above with reference to FIG. 19 (e.g., operations 1902, 1908-1924).

As explained with respect to FIG. 2, the front end search system 110 receives a visual query 1200 (FIG. 12) from a respective client system. In some embodiments, the front end search system 110 also receives a geographic location of the client system (e.g., a geographic location as determined by a GPS receiver or other location detection apparatus 707 in the respective client system, as shown in FIG. 5). The search system sends the visual query and the geographic location to a plurality of search systems, including the OCR search system 112-B. The OCR search system receives the visual query and the geographic location of the client system (2500).

The OCR module 620 performs optical character recognition on the visual query to produce text recognition data representing textual characters (1902). In some embodiments, the textual characters include a plurality of characters within a contiguous region of the visual query. The text evaluation engine 1710 scores each textual character in the plurality of textual characters, including scoring each textual character in the plurality of textual characters in accordance with the geographic location of the client system (2502). In some embodiments, the text evaluation engine generates a language-conditional character probability for each character (2504). In some embodiments, the language-conditional character probability is based on neighboring characters. The language-conditional character probability indicates how consistent the character and a set of characters that precede the character concord are with a language model that is selected in accordance with the geographic location of the client system. By using a language model that is based on (e.g., selected in accordance with) the geographic location of the client system from which the visual query is received, the scoring of a respective character is in accordance with the geographic location of the client system and can account for regional variations in language between regions. For example, spellings for the same words may be different between regions (e.g., spellings in American English vs. British English) and some words may be more prevalent in one region than another (e.g., certain words are more prevalent in the east coast regions of the United States that elsewhere in the United States).

In some embodiments, the OCR search system 112-B, when performing character recognition on the text in the visual query, adjusts its character recognition algorithms to look for words more prevalent in the geographic location of the client system or words spelled in a way that is specific to the geographic location of the client system.

In some embodiments, text evaluation engine 1710 then generates a text quality score for each character or symbol (1908). Optionally, the text quality score for an individual character or symbol is calculated for the character alone. Alternatively, the score of each character or symbol is influenced by its neighboring characters (1910). In some embodiments, the scoring is binary (1912). For example, each character is either scored as a high quality textual character or a low quality textual character. In some embodiments, a transition cost is associated with each character, such that the higher the transition cost, the more likely it is that a character will be scored similarly to its neighbors. For example, given a typical non-zero transition cost, if a neighboring character is scored as high quality, the current character is more likely to be scored as high quality as well than if the current character were scored in isolation, without consideration or influence by its neighbors.

The text evaluation engine 1710 also generates scores for text segments. Using the text segment scores, one or more high quality textual strings are identified (1914). Each textual string comprises a plurality of high quality textual characters from among the plurality of textual characters in the contiguous region of the visual query. In some embodiments, words in the visual query are scored (producing word scores) in accordance with the textual character scores of the textual characters comprising a respective word (1916). Then one or more high quality textual strings, each comprising a plurality of high quality textual words, are identified in accordance with the word scores (1914).

The document generation module 1730 (or, more generally, the text match application 632, or the visual query server system 106) identifies and retrieves a canonical source document containing one or more high quality textual strings (1918). The canonical source document is retrieved from the data store 1750. Then at least a portion of the canonical source document is sent to the client system (1920).

In some embodiments, the portion of the canonical source document that is returned is an image segment (1922). In other embodiments, the portion of the canonical source document that is returned is a machine readable text segment (1924). The term "machine readable text" means encoded text, such as Unicode or ASCII encoded text, that is machine readable without having to first convert an image into encoded text characters or symbols. In some embodiments the type of canonical source document returned depends on the quality score of the high quality textual string. As explained in more detail above with reference to FIG. 19, in some embodiments, when there are more than one identified high quality textual strings, the scores are combined to produce a single quality score. In some embodiments, an image version of the canonical source document is returned when the quality score is below a predetermined value, and a text version of the canonical source document is returned when the quality score is above the predetermined value.

In some embodiments, the original query is returned to the client system along with both a canonical source document image segment and a canonical source document text segment. As such, all three are provided for simultaneous presentation to the user. In this way the viewer can determine which version he prefers. For example, a user may wish to just read an article written in the New York Times, or he may wish to see the article as it appeared on the page of the newspaper as published, including any pictures, graphs, and advertisements on that newspaper page.

In some embodiments, the server system identifies one or more world wide web results relevant to the visual query and to the geographic location of the client system (2506) and sends the web results to the client system (2512). In some implementations, the web results are sent along with the original query and the canonical source document segment. These web results are analogous to web results 1514 (FIG. 20) but are also relevant to the geographic location of the client system as well as being relevant to the visual query and to the canonical source document.

In some embodiments and/or in some circumstances, the server system identifies a geographic term within the one or more high quality textual strings (2508) and identifies one or more web results associated with both the identified geographic term (in one or more of the high quality textual strings) and the geographic location of the client system (2510). For example, if the visual query is an image of a newspaper clipping, the text in the clipping includes the city or municipality name "Springfield" but without any additional disambiguating text, and the client system is in Illinois, then the server system identifies web results relevant to Springfield, Ill. as opposed to other cities or municipalities named Springfield (e.g., Springfield, Mass.; Springfield, Ohio, etc.). In other words, the geographic location of the client system is used to disambiguate an ambiguous location name in the OCR'ed text.

Figure 26:
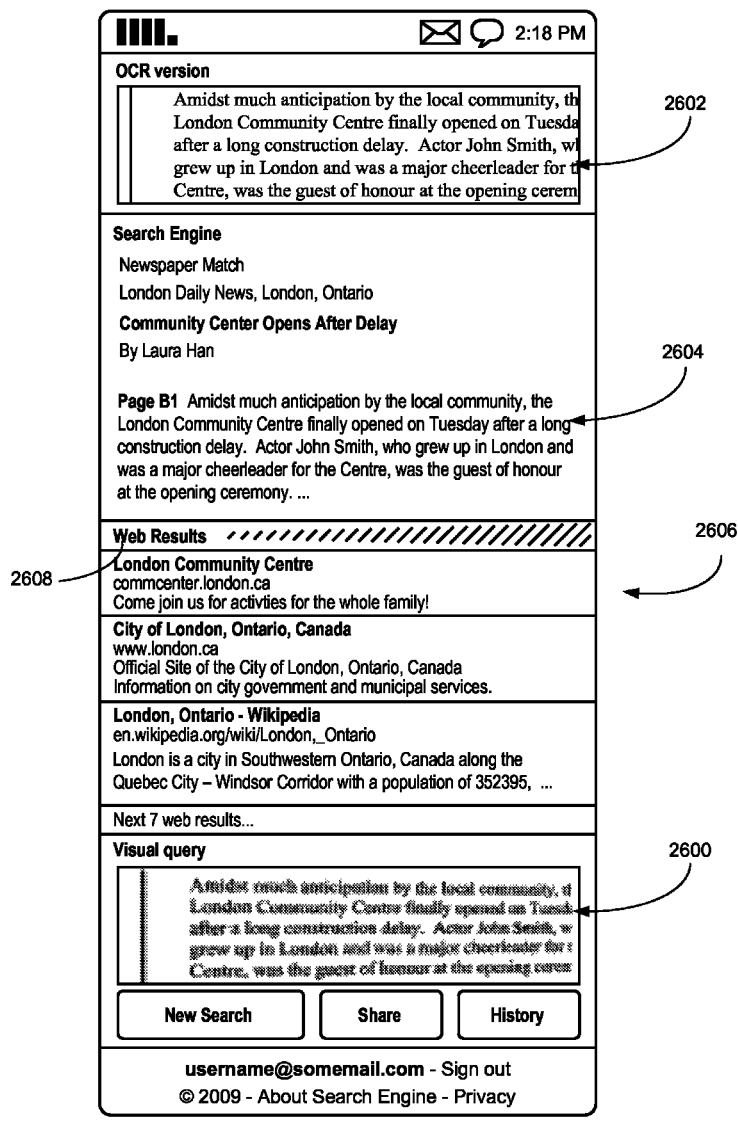
FIG. 26 illustrates a client system user interface in which a results list and canonical document portions returned in response to a visual query, in accordance with a geographic location of the client system, are displayed, according to some embodiments.

FIG. 26 illustrates a client system display of a results list 2606 and canonical document portions returned in response to a visual query 2600, in accordance with some embodiments. The visual query 2600 in this example is a photograph (e.g., a photograph or other image taken by a camera or image sensor 710 embedded in a mobile phone) of a portion of a newspaper article, sometimes called a newspaper clipping. The client device is located in Canada, as determined by a GPS receiver or other location detection apparatus 707 (FIG. 5) in the client system. The visual query 2600 is of low quality; the visual query image is out of focus and the page is warped. The visual query server system processed this query using an OCR search system 112-B (FIG. 8) that converted the visual query image into OCR'ed text and found high quality text strings which were then used to retrieve a matching canonical source document as explained with reference to FIGS. 25A-25B. In accordance with the geographic location of the client system (Canada), the OCR'ed text includes words spelled in accordance with Canadian English (e.g., centre, honour). In this embodiment, a portion of the canonical source document matching the visual query is provided in two formats. An image segment 2602 of the canonical source document is provided. The image segment matches both text and, if any, visual (or non-text) elements of the visual query. A machine readable text segment (sometimes herein called canonical text) of the canonical source document is provided as well 2604. In some embodiments, the client system or device 102 includes copy and paste instructions for copying text from the machine readable text segment 2604 and pasting the copied text into other documents or applications on the client device, in much the same way as text in other documents can be copied and pasted.

In addition to providing the canonical source document in two formats, the canonical source document information is used in some embodiments by one or more additional search systems 112-N, FIG. 1, to provide one or more of the additional relevant results shown in the results list 2606. In this embodiment, the additional search results include several web results 2608. The web results include results relevant to a location name in the canonical source document text (London) and to the geographic location of the client system (Canada). Thus, web results 2608 include web results relevant to London, Ontario, Canada as opposed to, say, London, England or London, Ky. The canonical text is useful in providing these additional search results that are likely to be of interest to the user.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of processing a visual query performed by a server system having one or more processors and memory storing one or more programs for execution by the one or more processors, the method comprising:
    at the server system:
        receiving a visual query from a client system distinct from the server system, the visual query including an image;
        performing optical character recognition (OCR) on the visual query to produce text recognition data representing textual characters including a plurality of textual characters in a contiguous region of the image of the visual query, and structural information associated with the plurality of textual characters in the contiguous region of the image of the visual query, the structural information specifying a position of at least one of the plurality of textual characters with respect to one or more reference point elements in the image of the visual query;
        scoring each textual character in the plurality of textual characters;
        identifying, in accordance with the scoring, one or more high quality textual strings, each comprising a plurality of high quality textual characters from among the plurality of textual characters in the contiguous region of the image of the visual query;
        retrieving, using the one or more high quality textual strings and the structural information, a canonical document that includes the one or more high quality textual strings at a location in the canonical document that is consistent with the structural information; and
        sending at least a portion of the canonical document to the client system.

2. The method of claim 1, wherein the structural information further specifies one or more of: relative positions of the textual characters in the image of the visual query, relative sizes of the textual characters in the image of the visual query, an ordering of the textual characters in the image of the visual query, a count of the textual characters in the image of the visual query, and a font category of the textual characters.

3. The method of claim 1, wherein the portion of the canonical document is an image segment of the canonical document.

4. The method of claim 3, wherein the image segment presented visually matches text and non-text elements of the visual query.

5. The method of claim 1, wherein the portion of the canonical document is a machine readable text segment of the canonical document.

6. The method of claim 1, wherein identifying the one or more high quality strings includes:
    scoring a plurality of words each in accordance with the textual character scores of the textual characters comprising a respective word to produce word scores; and
    identifying, in accordance with the word scores, one or more high quality textual strings, each comprising a plurality of high quality words.

7. The method of claim 1, wherein scoring of a respective textual character comprises scoring the respective textual character as either a high quality textual character or a low quality textual character.

8. The method of claim 1, wherein scoring of a respective textual character includes generating a language-conditional character probability for the respective textual character indicating how consistent the respective textual character and a set of characters that precede the respective textual character in a text segment are with a respective language model.

9. The method of claim 1, wherein the scoring of a respective textual character is based on both an OCR quality score of the respective textual character alone and a scoring of one or more neighboring textual characters.

10. The method of claim 1, wherein the sending includes sending the visual query, a canonical document image segment, and a canonical document machine readable text segment for simultaneous presentation.

11. A computer-implemented method of processing a visual query performed by a server system having one or more processors and memory storing one or more programs for execution by the one or more processors, the method comprising:
at the server system:
receiving a visual query from a client system distinct from the server system;
performing optical character recognition (OCR) on the visual query to produce text recognition data representing textual characters including a plurality of textual characters in a contiguous region of the visual query, and structural information associated with the plurality of textual characters in the contiguous region of the visual query;
scoring each textual character in the plurality of textual characters;
identifying, in accordance with the scoring, one or more high quality textual strings, each comprising a plurality of high quality textual characters from among the plurality of textual characters in the contiguous region of the visual query
retrieving a canonical document that includes the one or more high quality textual strings and that is consistent with the structural information, wherein the retrieving a canonical document further includes:
calculating a quality score corresponding to at least one respective high quality textual string of the one or more high quality textual strings;
retrieving an image version of the canonical document if the quality score is below a predetermined value; and
retrieving a machine readable text version of the canonical document if the quality score is at or above a predetermined value; and
sending at least a portion of the canonical document to the client system.

12. A server system, for processing a visual query, comprising:
one or more central processing units for executing programs;
memory storing one or more programs be executed by the one or more central processing units;
the one or more programs comprising instructions for:
receiving a visual query from a client system, the visual query including an image;
performing optical character recognition (OCR) on the visual query to produce text recognition data representing textual characters including a plurality of textual characters in a contiguous region of the image of the visual query, and structural information associated with the plurality of textual characters in the contiguous region of the image of the visual query, the structural information specifying a position of at least one of the plurality of textual characters with respect to one or more reference point elements in the image of the visual query;
scoring each textual character in the plurality of textual characters;
identifying, in accordance with the scoring, one or more high quality textual strings, each comprising a plurality of high quality textual characters from among the plurality of textual characters in the contiguous region of the image of the visual query;
retrieving, using the one or more high quality textual strings and the structural information, a canonical document that includes the one or more high quality textual strings at a location in the canonical document that is consistent with the structural information; and
sending at least a portion of the canonical document to the client system.

13. The system of claim 12, wherein the structural information further specifies one or more of: relative positions of the textual characters in the image of the visual query, relative sizes of the textual characters in the image of the visual query, an ordering of the textual characters in the image of the visual query, a count of the textual characters in the image of the visual query, and a font category of the textual characters.

14. The server system of claim 12, wherein the portion of the canonical document is an image segment of the canonical document.

15. The server system of claim 14, wherein the image segment presented visually matches text and non-text elements of the visual query.

16. The server system of claim 12, wherein the portion of the canonical document is a machine readable text segment of the canonical document.

17. A non-transitory computer readable storage medium storing one or more programs configured for execution by a computer, the one or more programs comprising instructions for:
receiving a visual query from a client system, the visual query including an image;
performing optical character recognition (OCR) on the visual query to produce text recognition data representing textual characters including a plurality of textual characters in a contiguous region of the image of the visual query, and structural information associated with the plurality of textual characters in the contiguous region of the image of the visual query, the structural information specifying position of the plurality of textual characters with respect to one or more reference point elements in the image of the visual query;
scoring each textual character in the plurality of textual characters;
identifying, in accordance with the scoring, one or more high quality textual strings, each comprising a plurality of high quality textual characters from among the plurality of textual characters in the contiguous region of the image of the visual query;
retrieving, using the one or more high quality textual strings and the structural information, a canonical document that includes the one or more high quality textual strings at a location in the canonical document that is consistent with the structural information; and sending at least a portion of the canonical document to the client system.

18. The non-transitory computer readable storage medium of claim 17, wherein the structural information further specifies one or more of: relative positions of the textual characters in the image of the visual query, relative sizes of the textual characters in the image of the visual query, an ordering of the textual characters in the image of the visual query, a count of the textual characters in the image of the visual query, and a font category of the textual characters.

19. The non-transitory computer readable storage medium of claim 17, wherein the portion of the canonical document is an image segment of the canonical document.

20. The non-transitory computer readable storage medium of claim 19, wherein the image segment presented visually matches text and non-text elements of the visual query.

21. The non-transitory computer readable storage medium of claim 17, wherein the portion of the canonical document is a machine readable text segment of the canonical document.

22. The method of claim 1, wherein the one or more reference point elements comprise at least one of a text character, a margin of the image of the visual query, an edge of the image of the visual query, and a line break.

23. The server system of claim 12, wherein the one or more reference point elements comprise at least one of a text character, a margin of the image of the visual query, an edge of the image of the visual query, and a line break.

24. The non-transitory computer readable storage medium of claim 17, wherein the one or more reference point elements comprise at least one of a text character, a margin of the image of the visual query, an edge of the image of the visual query, and a line break.

\* \* \* \* \*